(12) United States Patent
Zang

(10) Patent No.: US 8,388,031 B1
(45) Date of Patent: Mar. 5, 2013

(54) HIGH STRENGTH SHOVEL AND TROWELS

(76) Inventor: Richard Zang, Palmetto, FL (US)

( * ) Notice: Subject to any disclaimer, the term of this patent is extended or adjusted under 35 U.S.C. 154(b) by 0 days.

(21) Appl. No.: 13/111,519

(22) Filed: May 19, 2011

Related U.S. Application Data

(63) Continuation-in-part of application No. 29/390,309, filed on Apr. 22, 2011.

(51) Int. Cl.
*A01B 1/00* (2006.01)
*A01D 9/00* (2006.01)
*A01D 11/00* (2006.01)

(52) U.S. Cl. .......... 294/49; 294/55.5

(58) Field of Classification Search .......... 294/176, 294/49, 51, 52, 55.5, 56, 61, 182; 30/346.55, 30/346.56, 346.6, 346.61, 351; 172/371–381
See application file for complete search history.

(56) References Cited

U.S. PATENT DOCUMENTS

| | | | | |
|---|---|---|---|---|
| 339,527 A | * | 4/1886 | Calef | 294/55.5 |
| 827,542 A | * | 7/1906 | Lawson | 56/400.04 |
| 1,504,913 A | * | 8/1924 | Simoncelli | 294/52 |
| 2,429,120 A | * | 10/1947 | Brandt | 172/375 |
| D250,083 S | | 10/1978 | Insalaco | |
| 4,135,751 A | | 1/1979 | Gederos | |
| 4,203,210 A | * | 5/1980 | Hadlick, Jr. | 30/172 |
| 4,247,141 A | | 1/1981 | Grint | |
| 4,334,583 A | | 6/1982 | Parker | |
| D265,791 S | | 8/1982 | Fieni | |
| D266,899 S | | 11/1982 | Moore | |
| D269,403 S | | 6/1983 | Miyata | |
| 4,396,214 A | | 8/1983 | Lesche | |
| D272,799 S | | 2/1984 | Pluss | |
| 4,565,398 A | | 1/1986 | Poulin | |
| 4,642,918 A | | 2/1987 | Venables | |
| D292,261 S | * | 10/1987 | Mitton | D8/13 |
| 4,865,372 A | | 9/1989 | Gabriel | |
| 4,901,801 A | | 2/1990 | Popivalo | |
| 4,916,984 A | | 4/1990 | Albert | |
| D332,555 S | | 1/1993 | Hagerman | |
| 5,306,061 A | | 4/1994 | Ives | |
| 5,383,696 A | | 1/1995 | Speier | |
| D363,862 S | | 11/1995 | Lusignan | |
| 5,520,429 A | | 5/1996 | Gregory | |
| 5,533,578 A | | 7/1996 | Powell | |
| 5,645,305 A | | 7/1997 | Lispi | |
| D388,292 S | | 12/1997 | Rich | |
| D388,668 S | | 1/1998 | Rich | |
| 5,752,285 A | | 5/1998 | Bendheim | |
| 5,810,407 A | | 9/1998 | Melendez | |
| 5,865,490 A | | 2/1999 | Vowell | |
| 5,887,921 A | | 3/1999 | Rapoport | |
| D412,093 S | * | 7/1999 | Alexander et al. | D8/10 |
| 5,918,922 A | * | 7/1999 | Lathrop et al. | 294/180 |
| 6,109,013 A | | 8/2000 | Scott | |
| D430,463 S | | 9/2000 | Claxton | |
| D434,288 S | | 11/2000 | Todd | |
| D448,258 S | | 9/2001 | Hay | |

(Continued)

*Primary Examiner* — Dean Kramer
*Assistant Examiner* — Stephen Vu
(74) *Attorney, Agent, or Firm* — Brian S. Steinberger; Law Offices of Briand S. Steinberger, P.A.

(57) ABSTRACT

Shovels and trowels are formed from metal and plastic for enhanced soil and sand penetration, and for cutting into roots. The shovels and trowels can each have one or more narrow tip teeth edges extending outward from the front end of the blade, the teeth edges each having embossed surface portions for strengthening the blade and disbursing stress during digging applications. The embossed portions can be indented. The embossed portions can be raised. A shovel version can also have foot brakes on both side of the handle above the rear end of the blade, to allow for a stable and safe foot placement.

18 Claims, 29 Drawing Sheets

U.S. PATENT DOCUMENTS

| | | |
|---|---|---|
| D459,169 S | 6/2002 | Clivio |
| D485,479 S | 1/2004 | Rack |
| D495,568 S | 9/2004 | Register |
| 6,837,528 B1 | 1/2005 | Britt |
| 7,052,058 B2 | 5/2006 | Olinski |
| D570,654 S | 6/2008 | Baker |
| D588,882 S | 3/2009 | Baker |
| D593,384 S | 6/2009 | Deziel |
| D596,470 S | 7/2009 | Greenly |
| D601,869 S | 10/2009 | Nelson |
| D602,751 S | 10/2009 | Boies |
| D606,817 S | 12/2009 | Boies |
| 7,669,506 B2 | 3/2010 | Cox |

\* cited by examiner

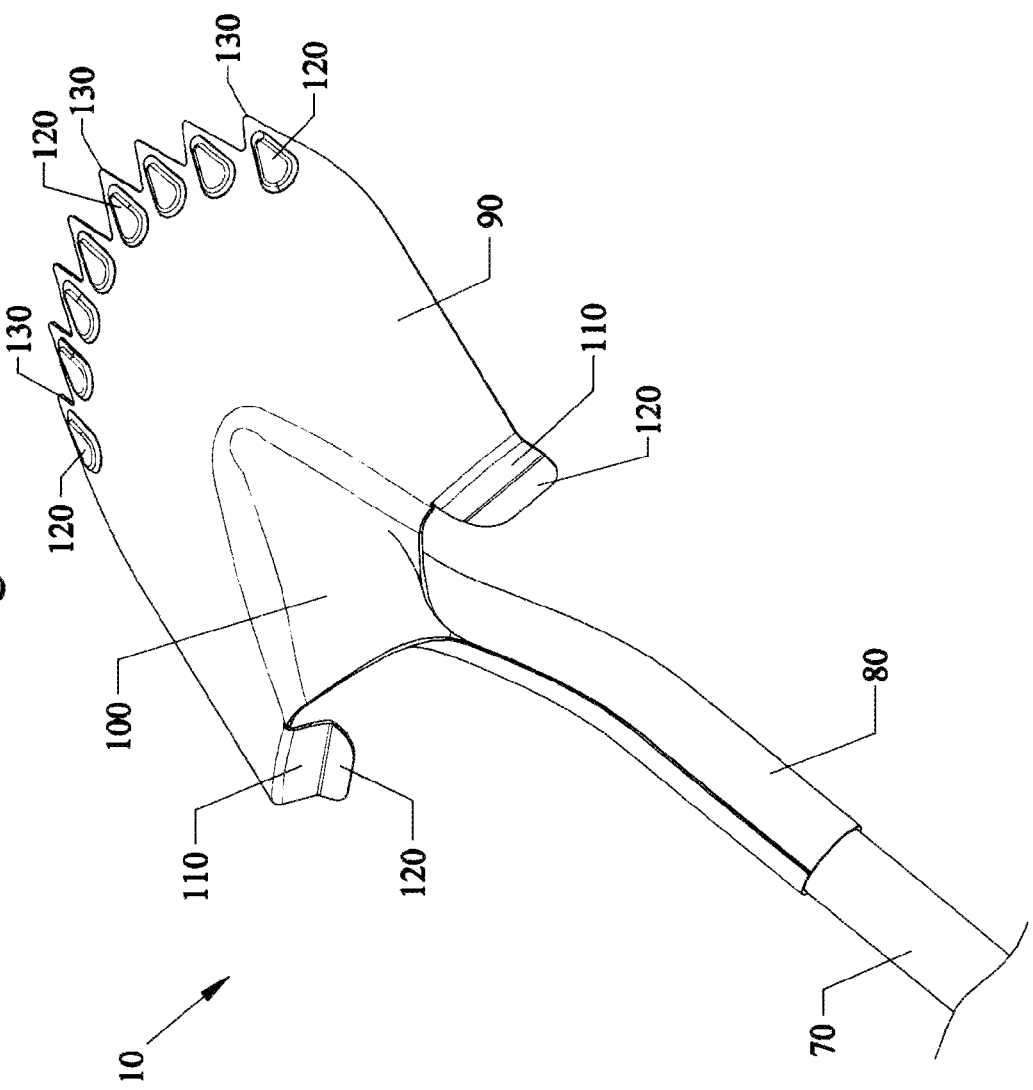

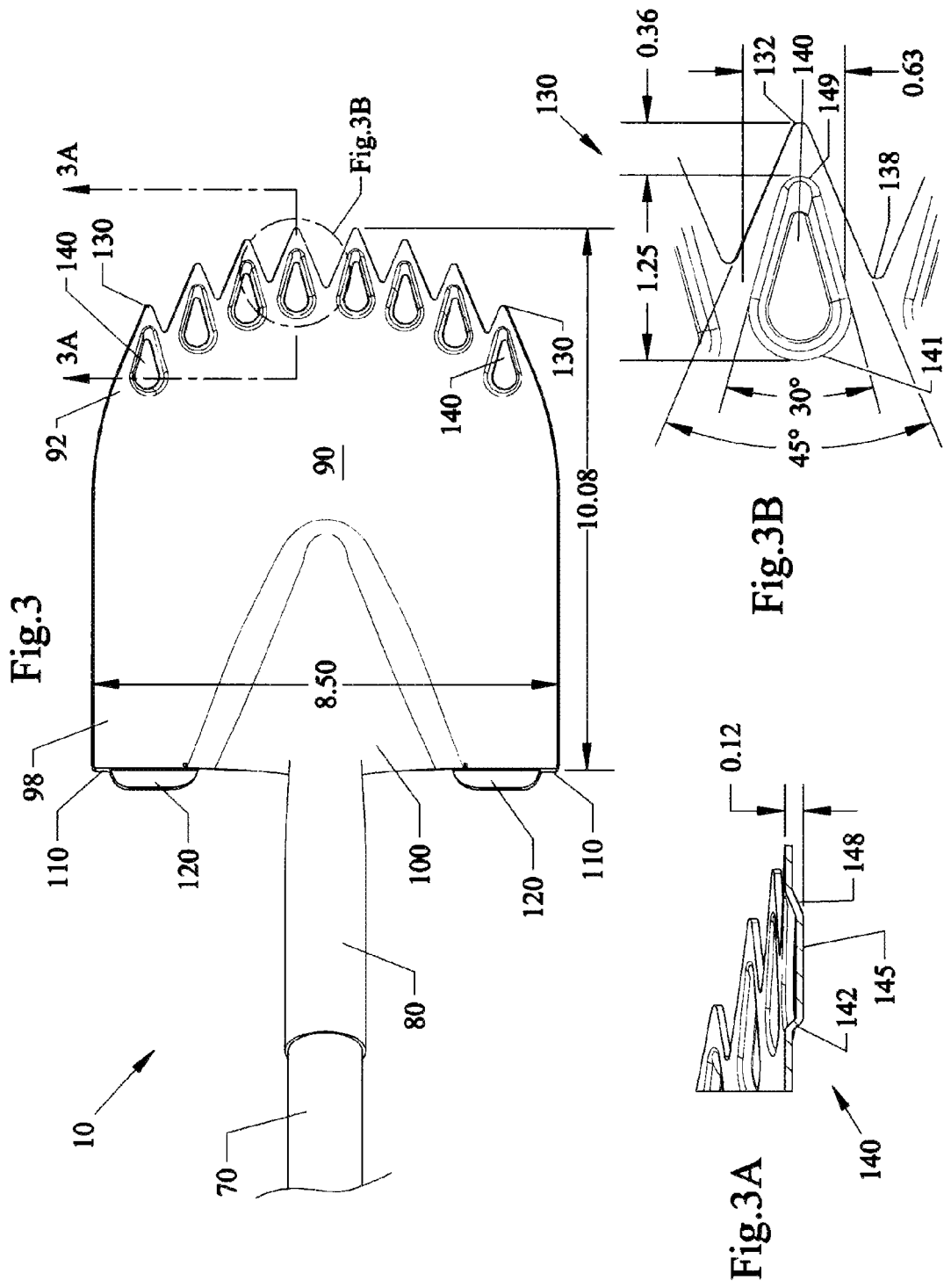

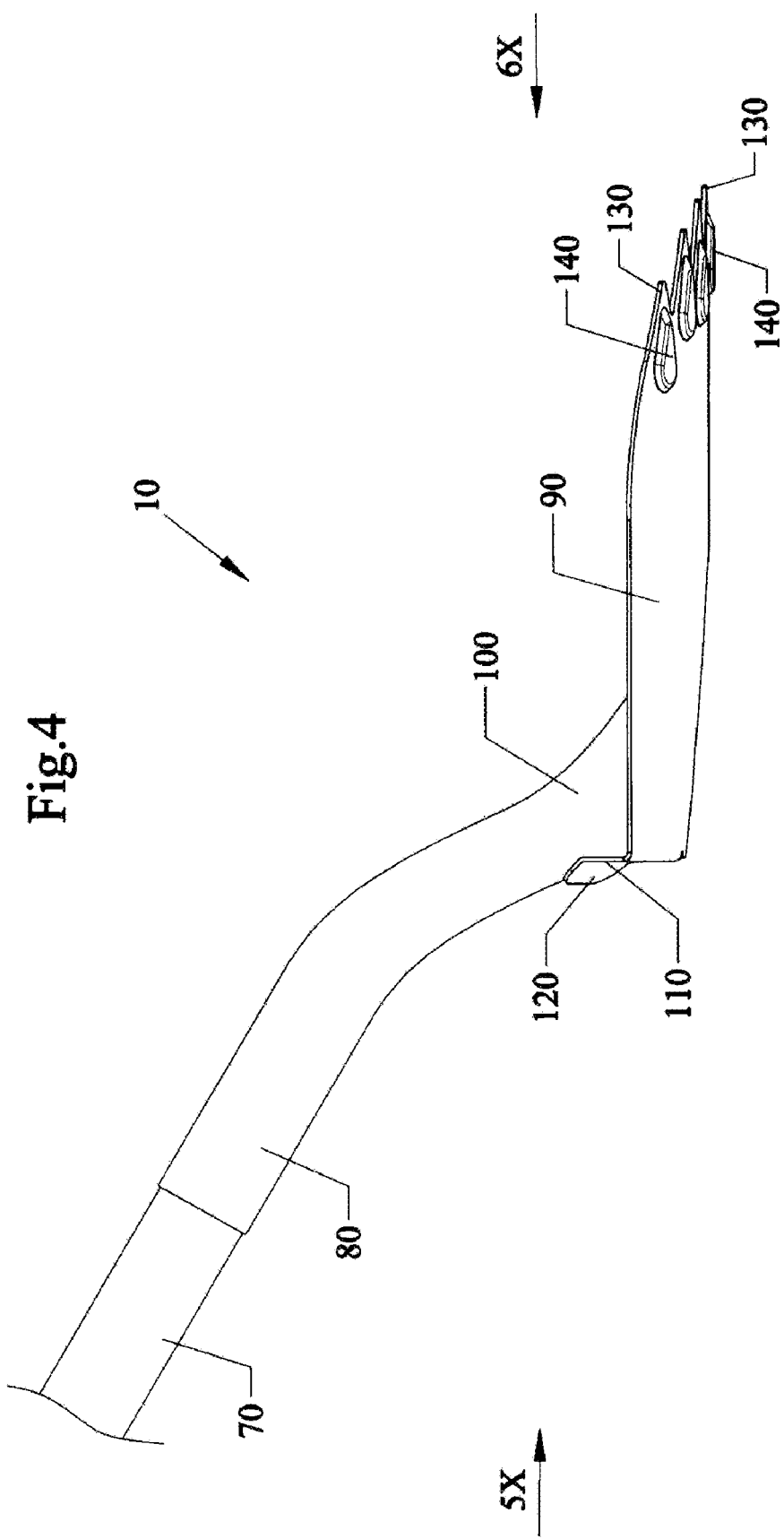

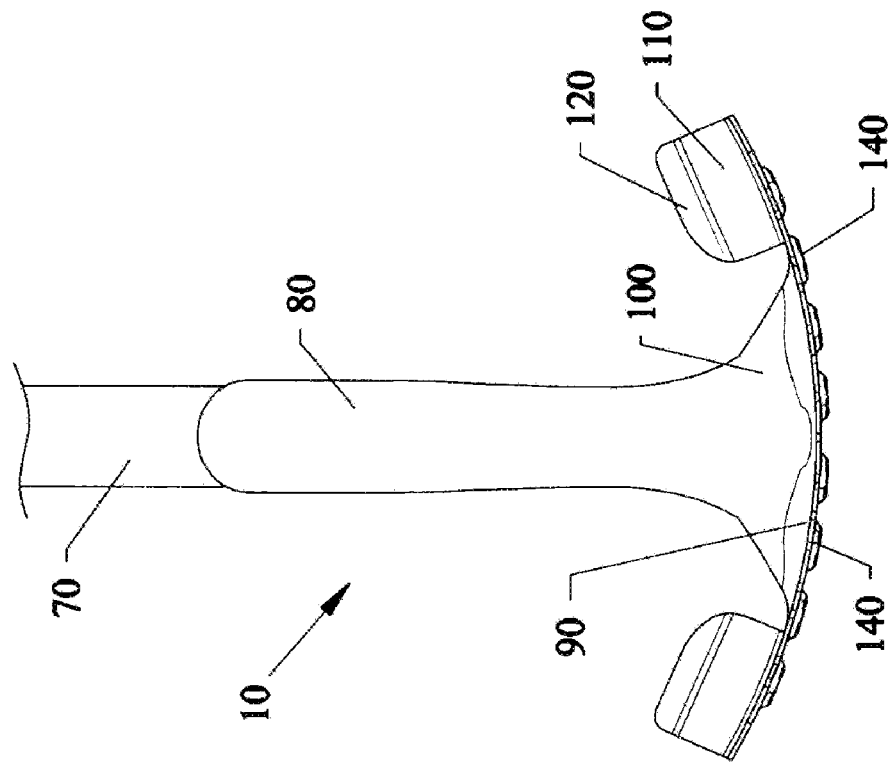
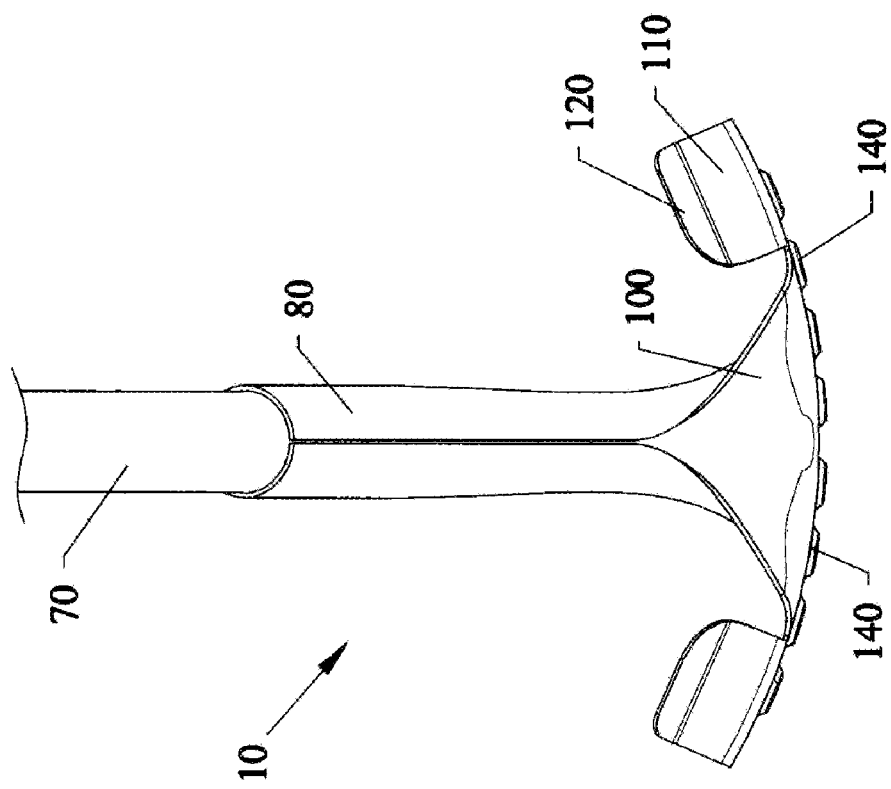

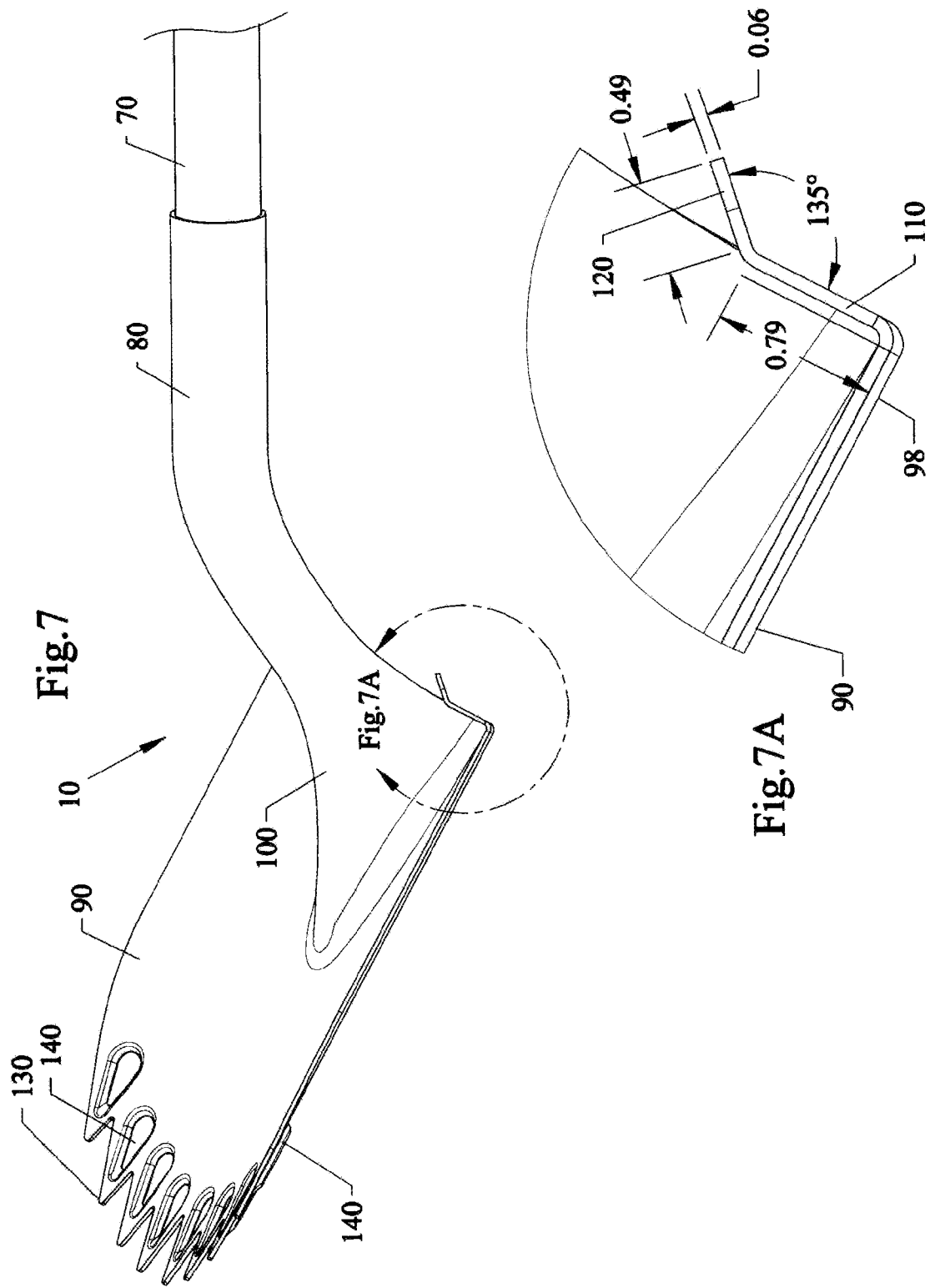

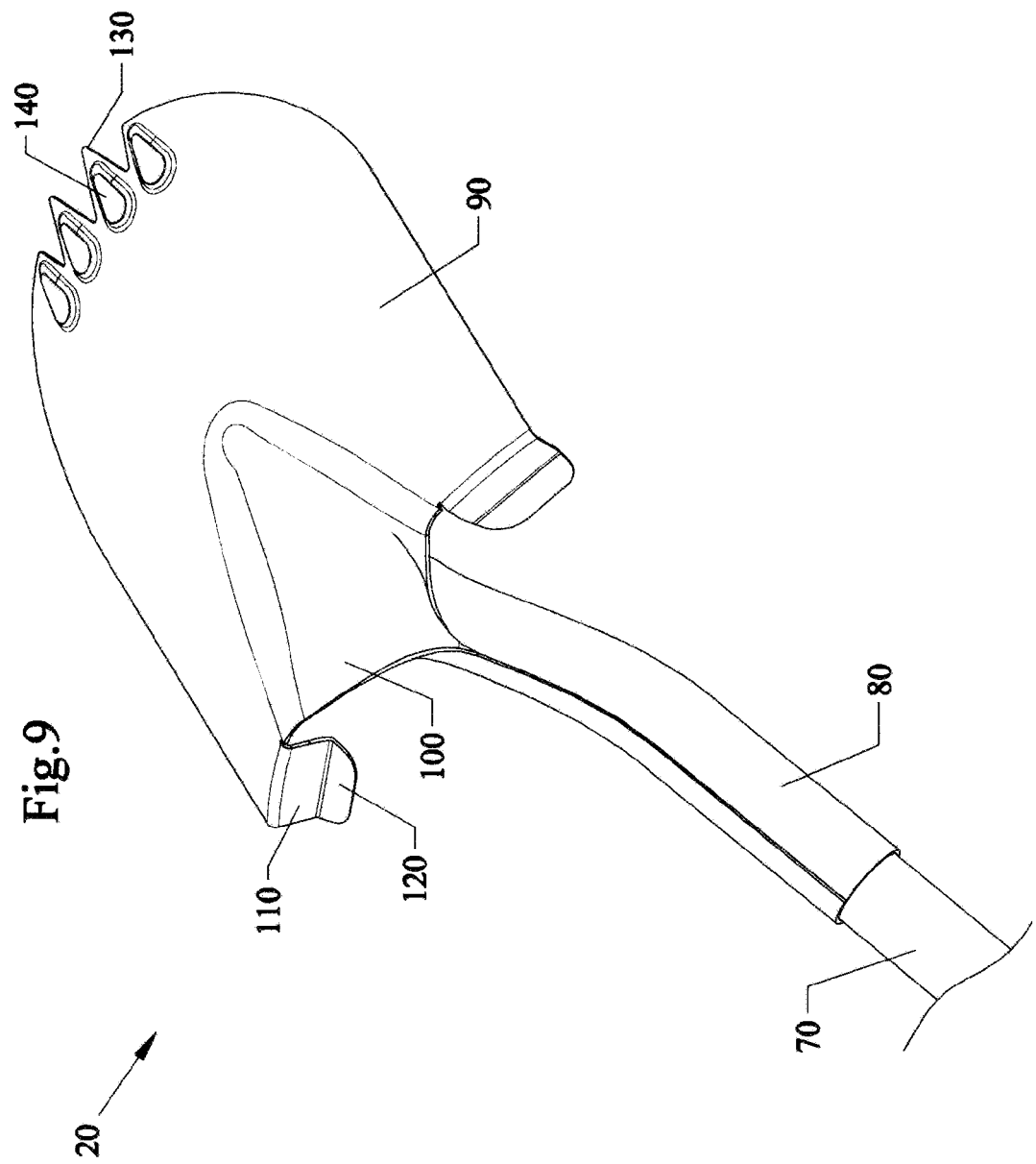

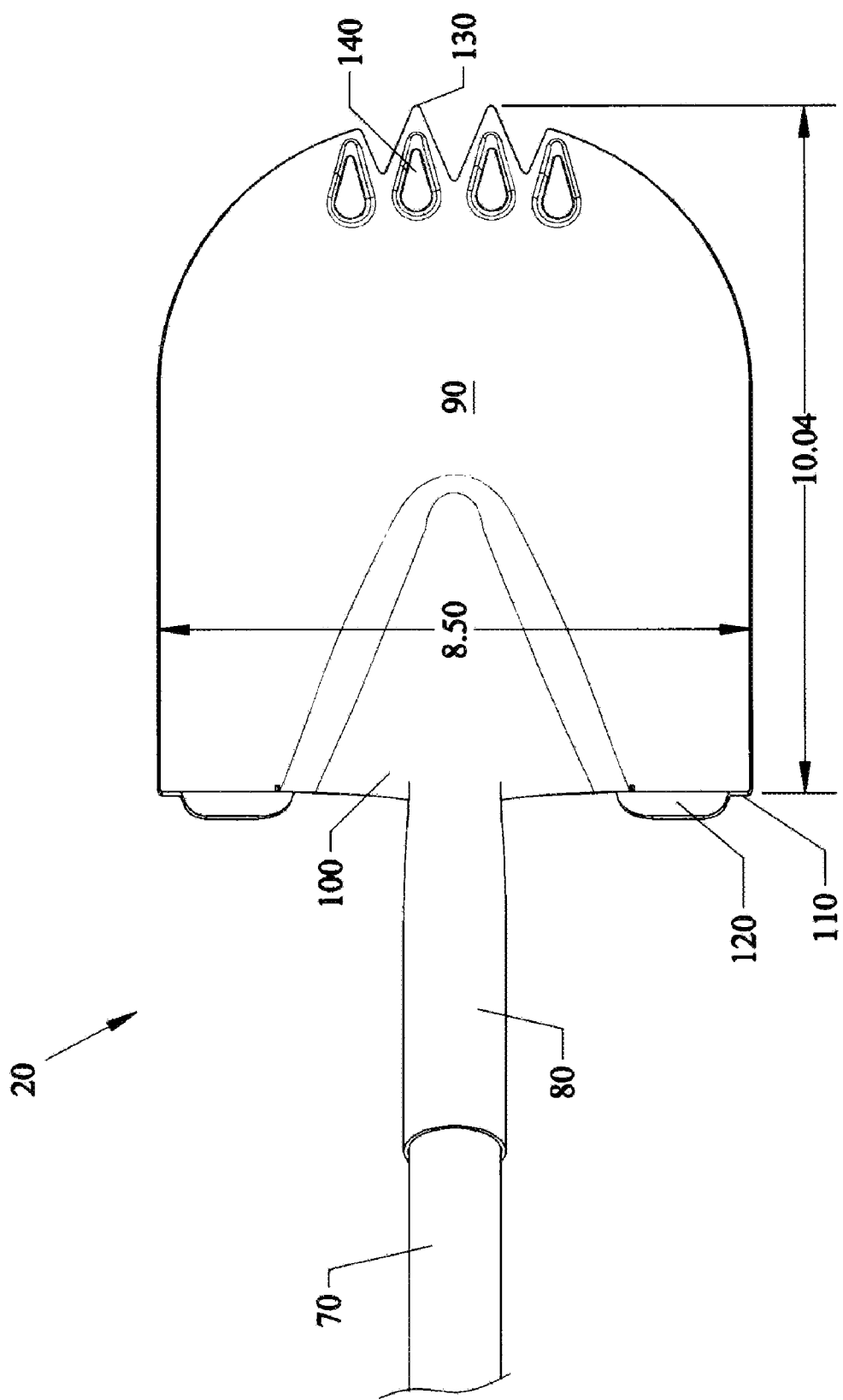

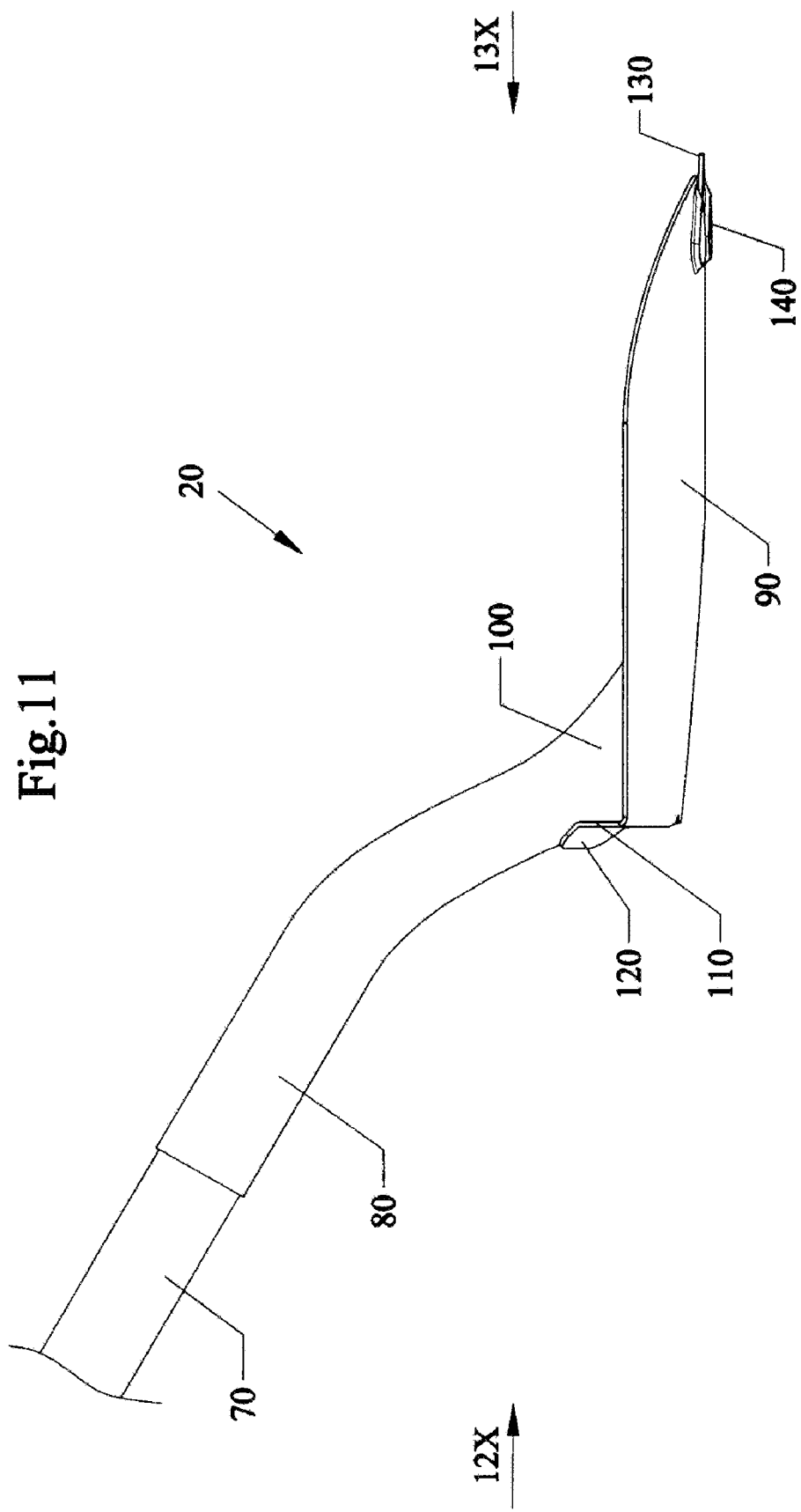

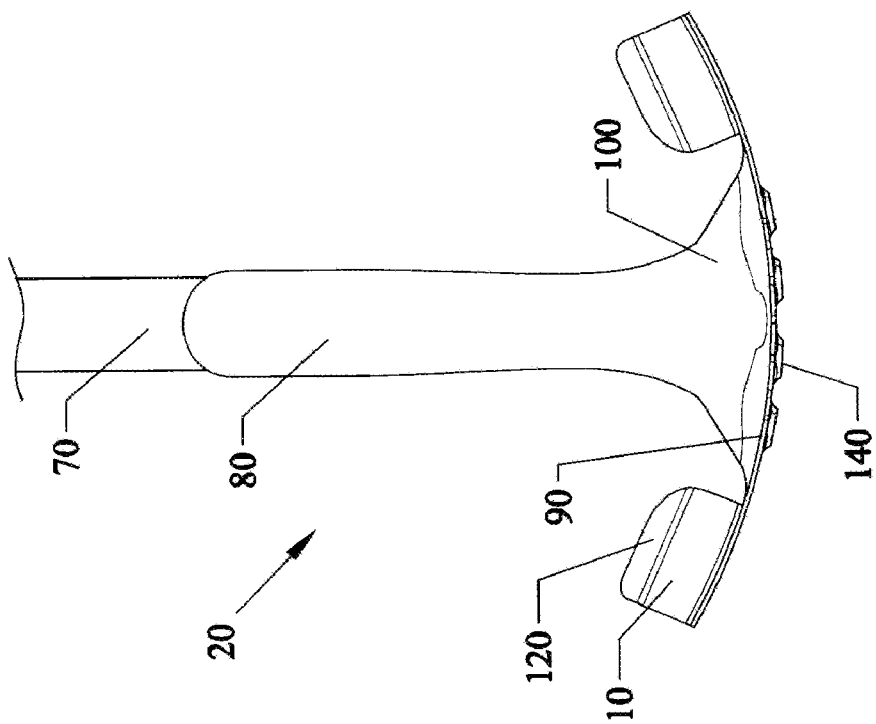
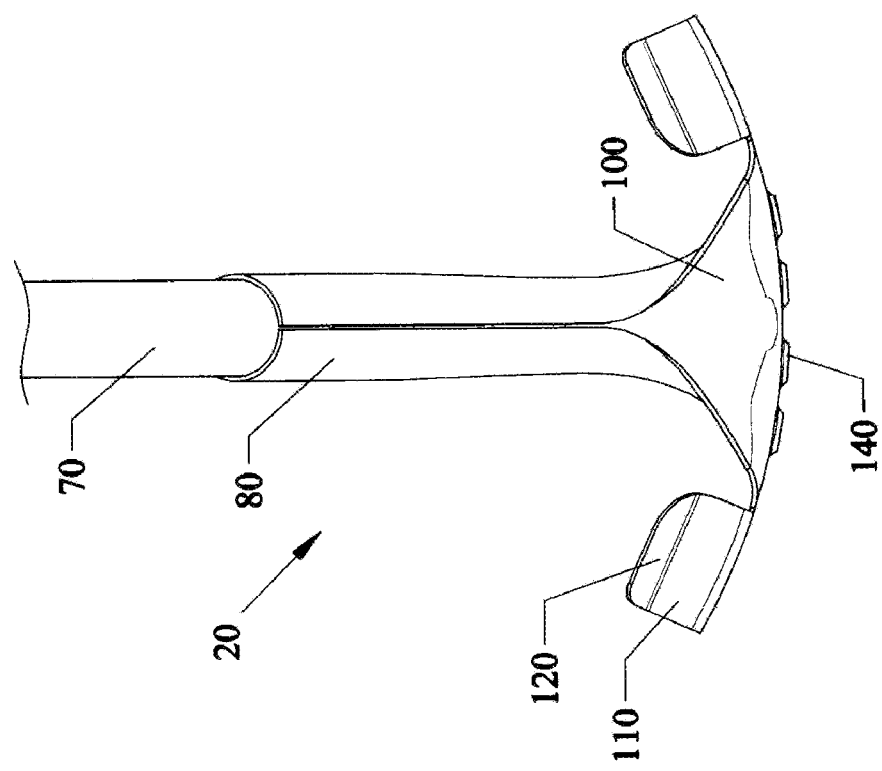

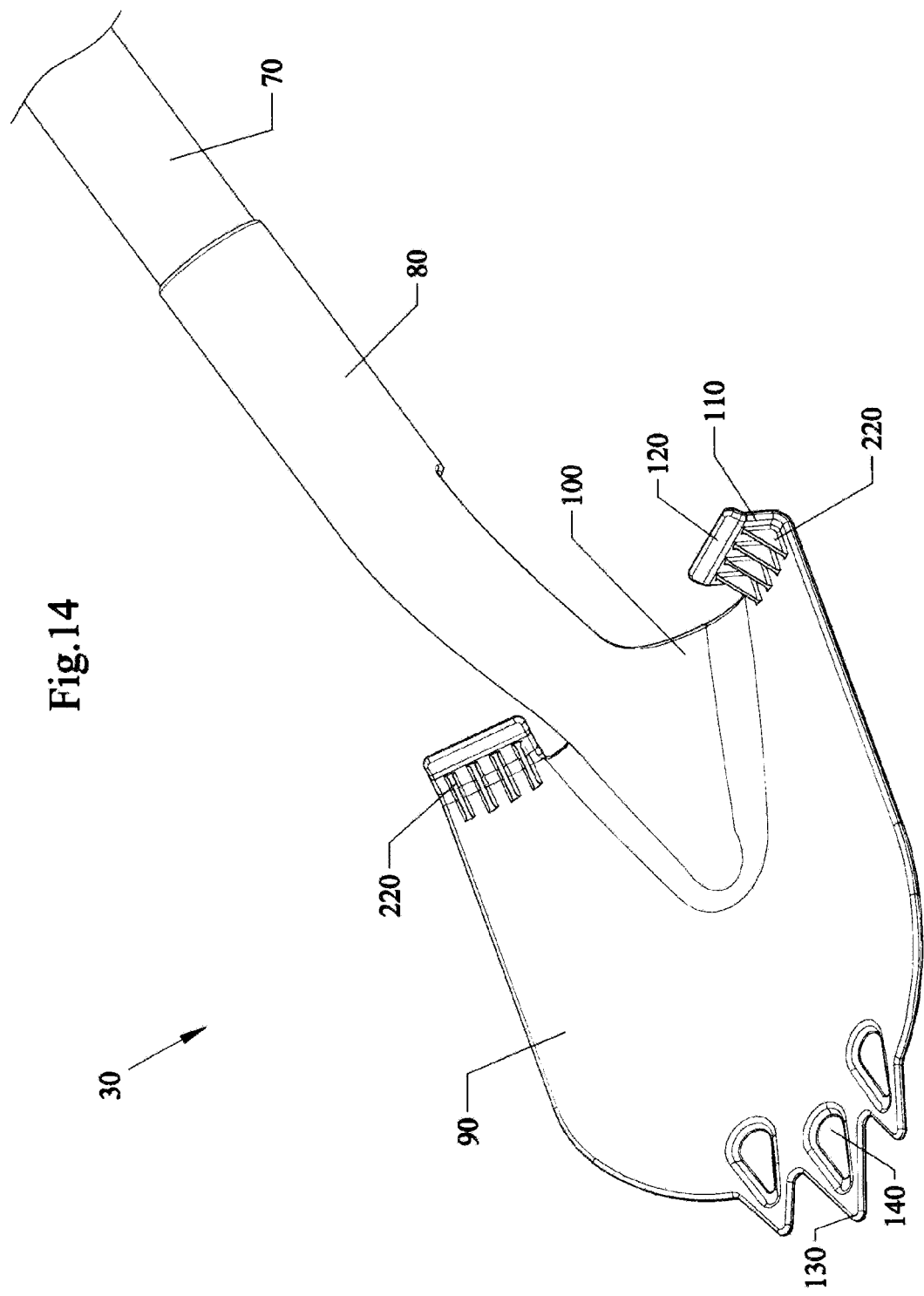

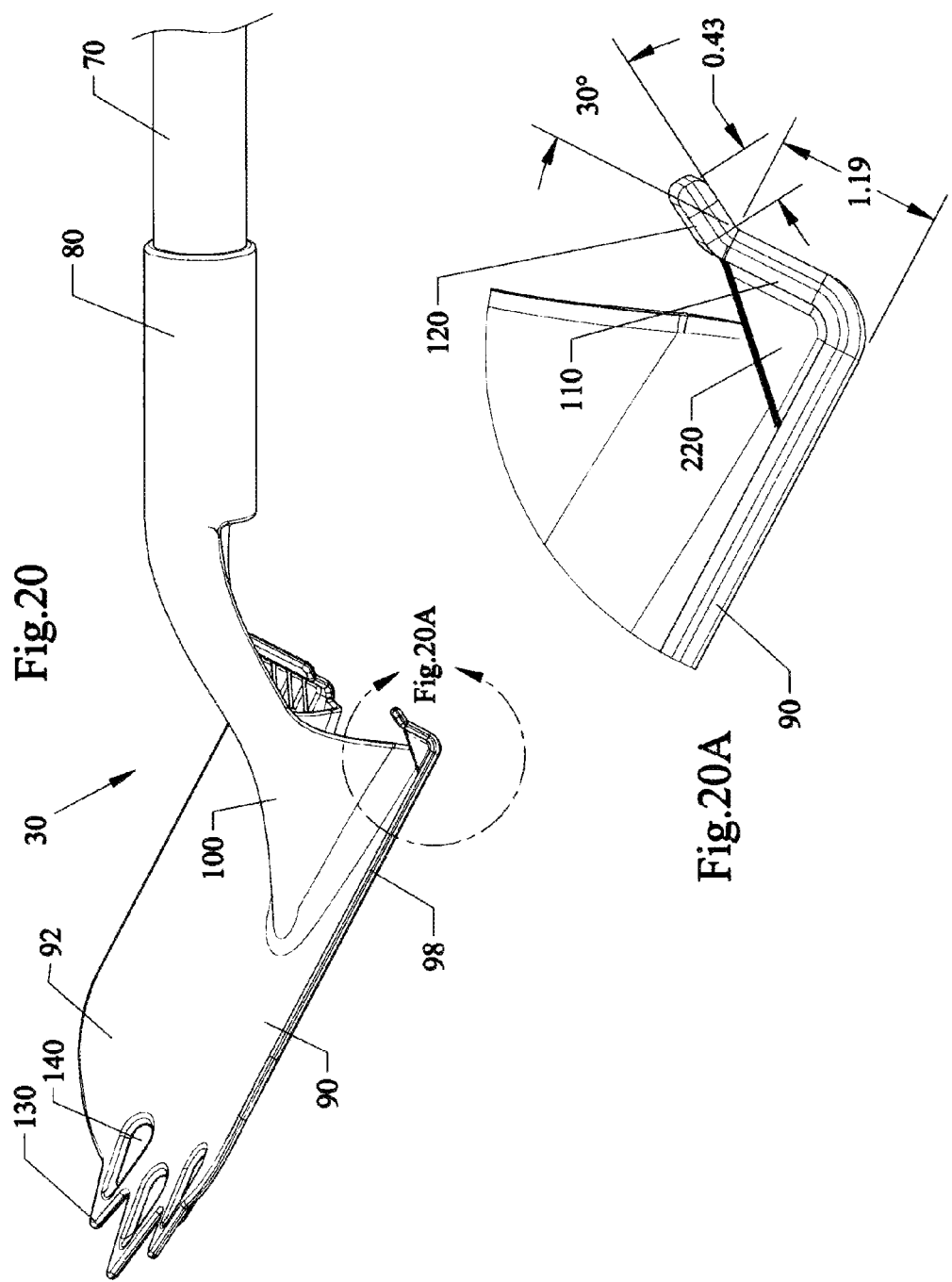

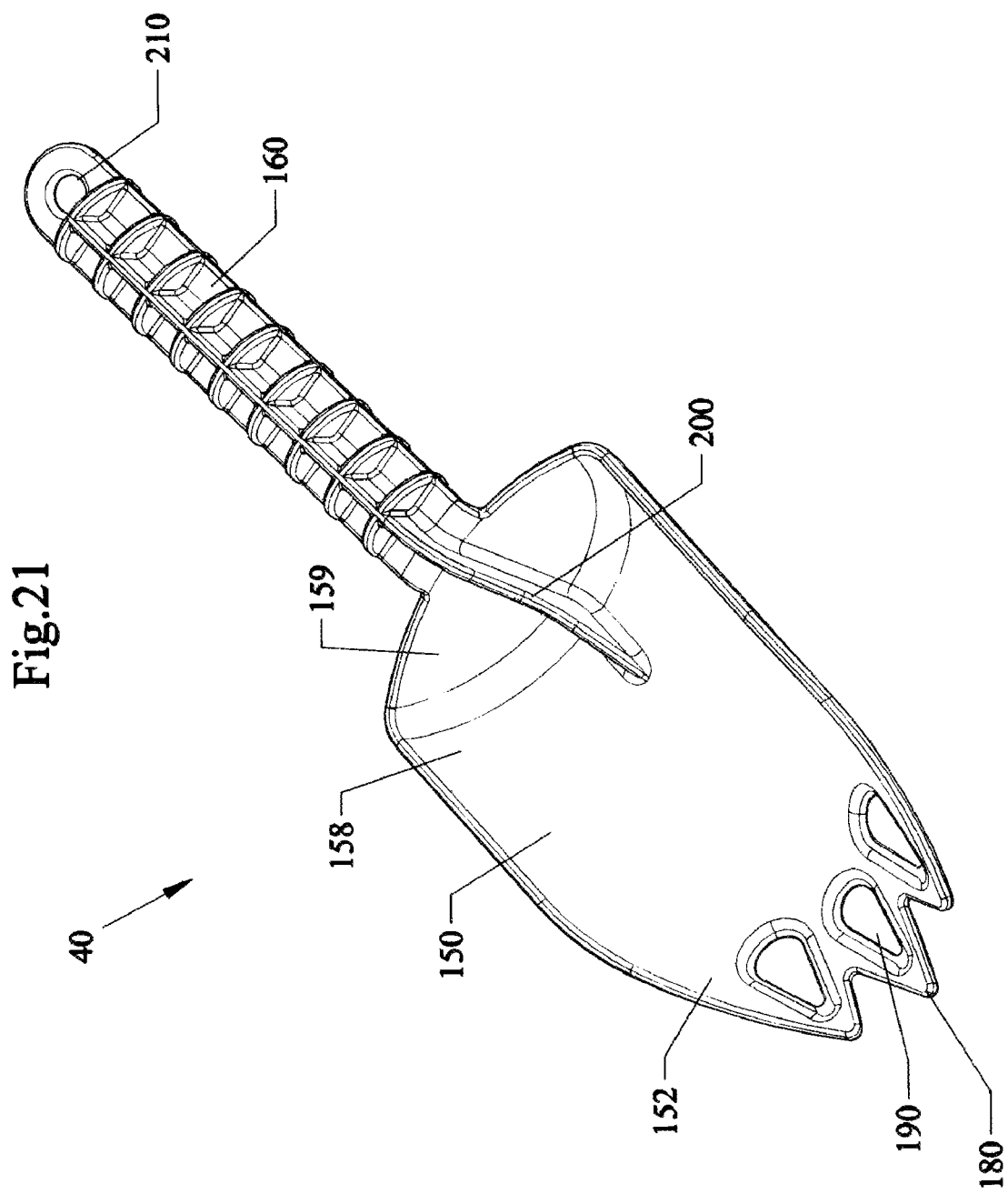

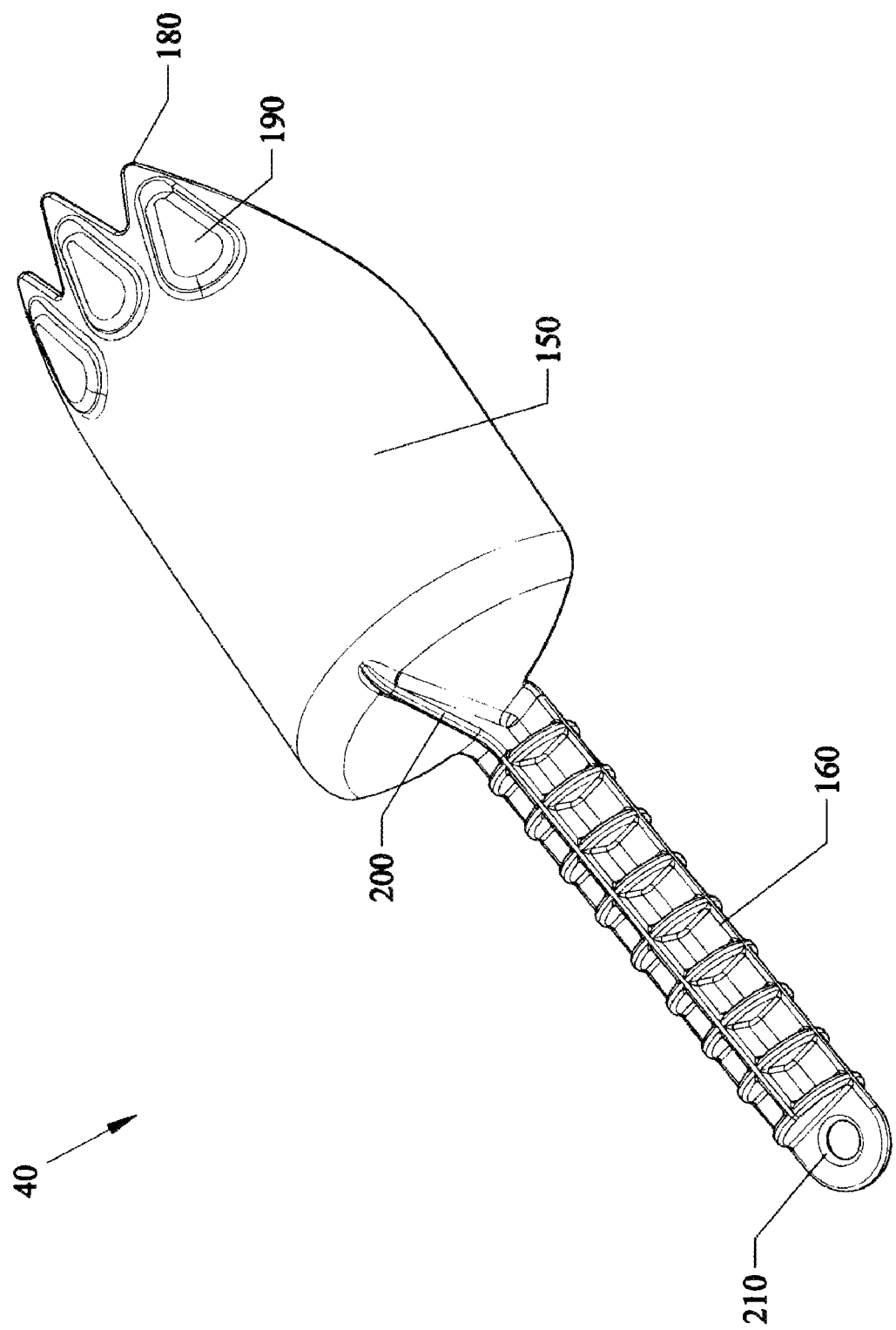

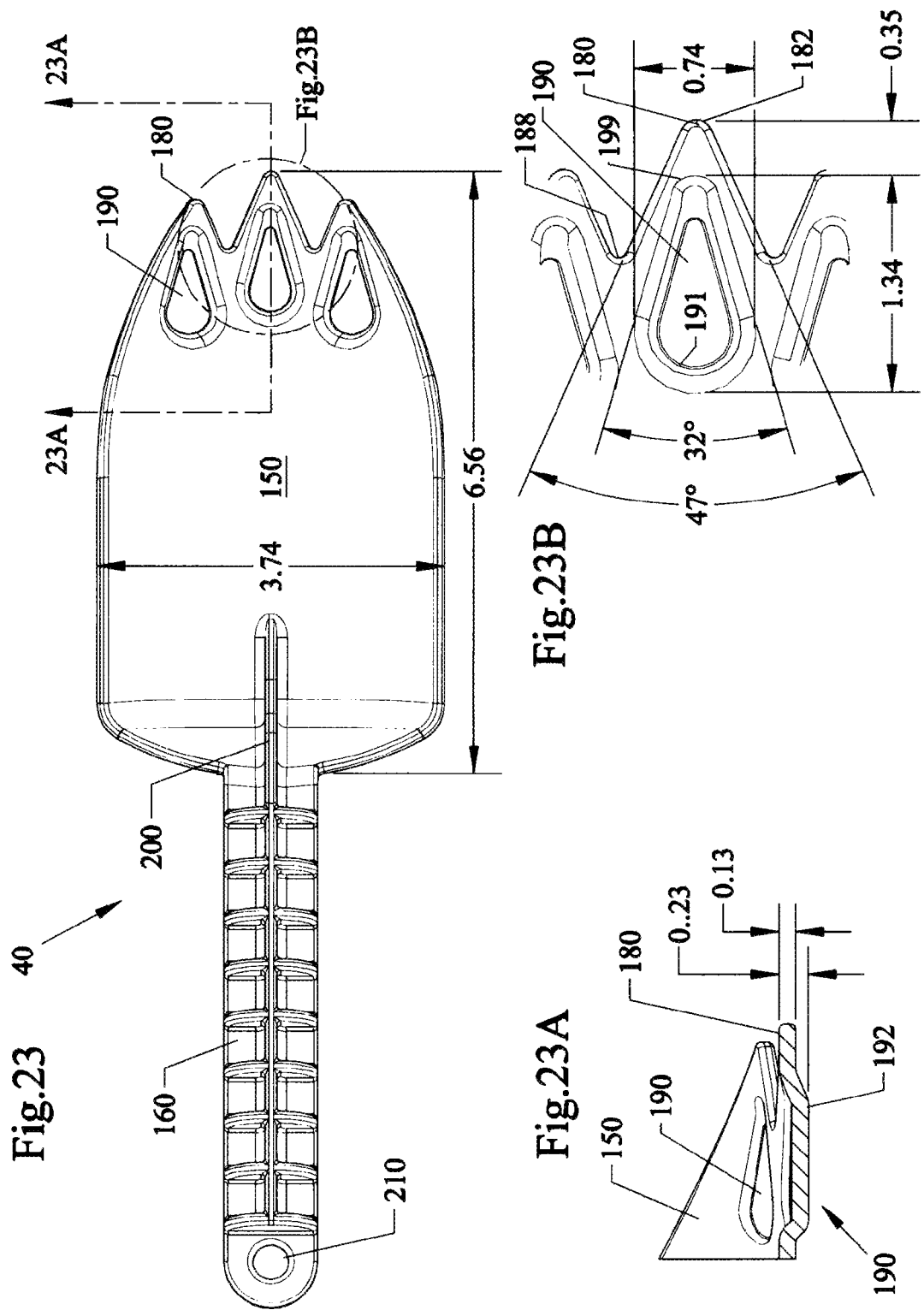

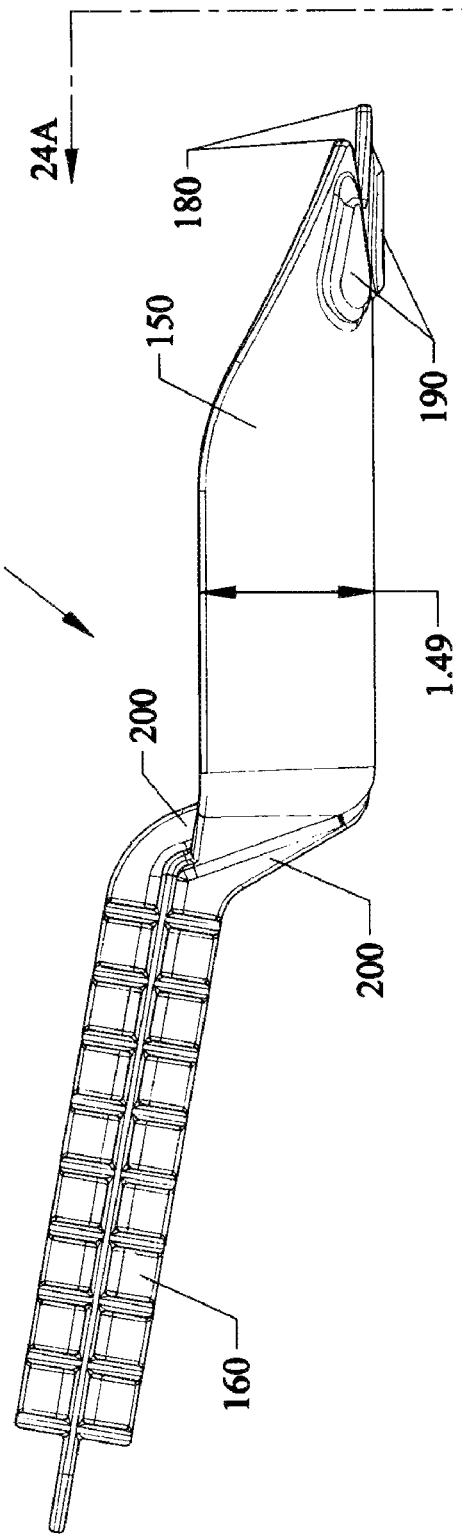
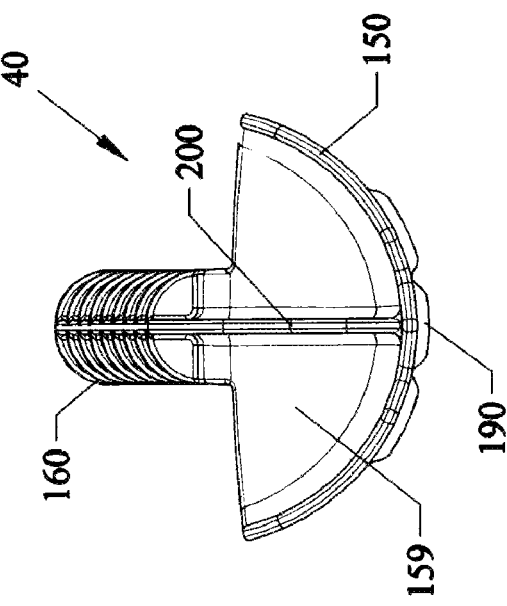

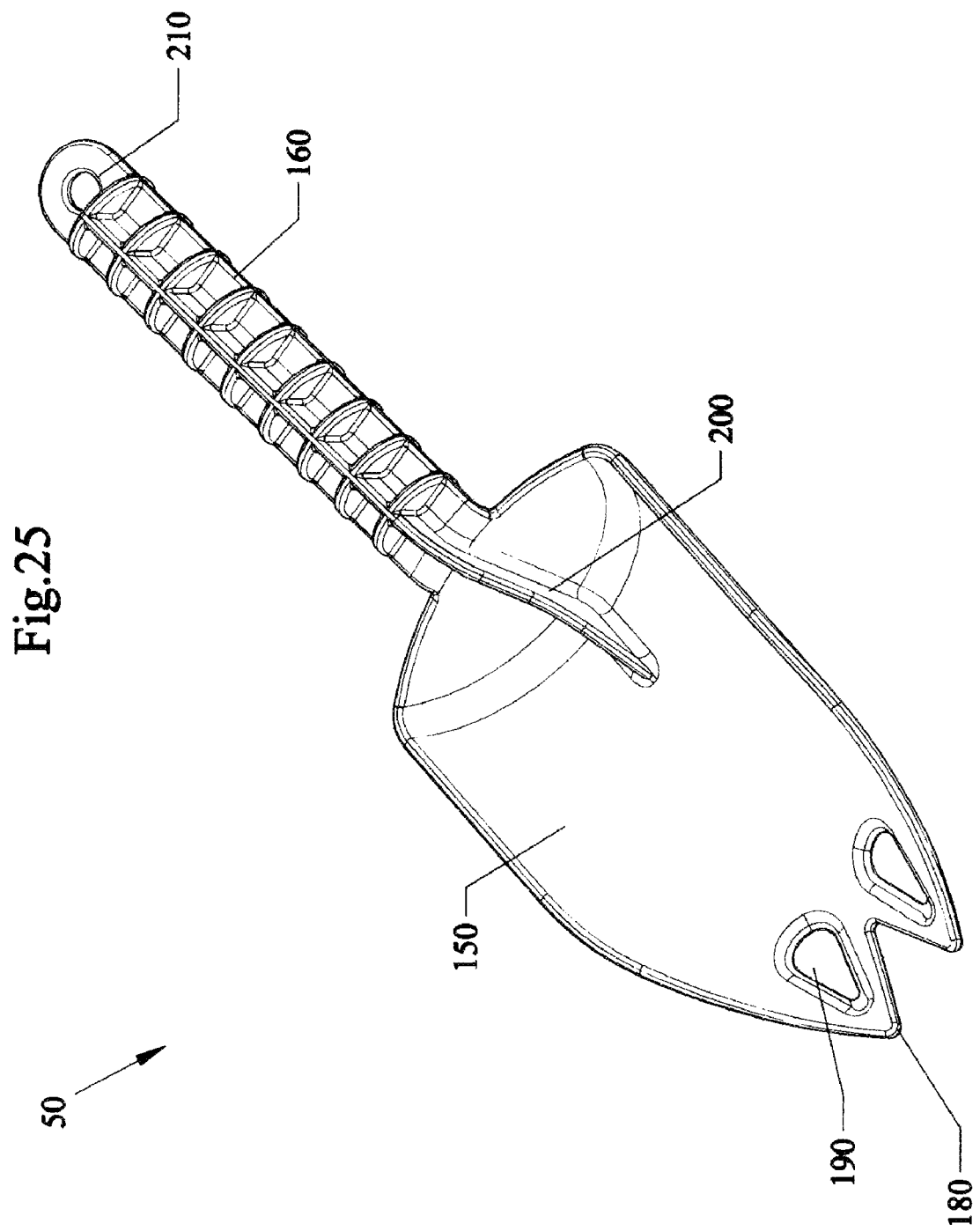

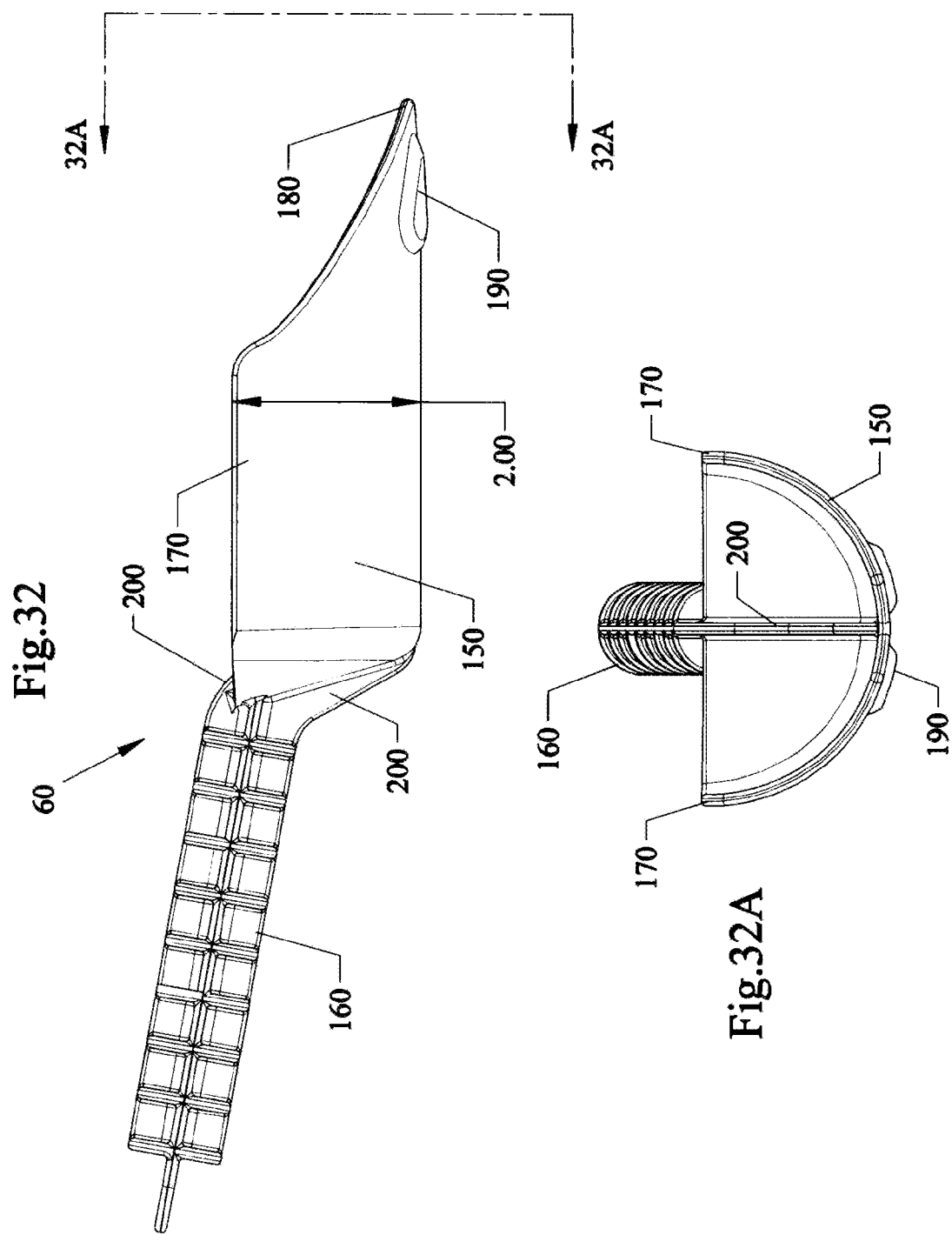

HIGH STRENGTH SHOVEL AND TROWELS

CROSS REFERENCE TO RELATED APPLICATIONS

This invention is a Continuation-In-Part of U.S. Design patent application Ser. No. 29/390,309 filed Apr. 22, 2011.

FIELD OF INVENTION

This invention relates to shovels and trowels, in particular to high strength shovels and trowels formed from metal and plastic for enhanced soil and sand penetration and cutting into roots.

BACKGROUND AND PRIOR ART

Many commercial types of digging and cutting tools have been proposed over the years for penetrating and moving soil and sand. Commercially available digging and cutting tools have included shovels and trowels. Digging and cutting tools are comprised of shovels and trowels and are usually grouped into two primary types. A first type usually includes a relatively flat bottom surface and a second type usually includes upper surface with a generally concave configuration. Particularly with those shovels having a flat surface, sides may be provided extending from the flat surface to prevent the material from falling off the shovel. There are many problems with these types of digging and cutting tools.

One particular problem existing in currently available shovels is their lack of sufficient strength for penetrating rocky soils, hardened soils, soils having significant tree root infestation, as well as grassy covered soils. Often the commercially available shovels have blades that are prone to bending and can often break when the shovel is being used for digging in difficult hardened soils.

In addition to the blade bending and breaking, the tip edge of many commercial shovels can also bend and/or break when being used. A bent tip and/or breakage can result in lost time and possibly an unusable digging tool.

Hence, there exists a need for a high strength shovel having the ability to freely penetrate such hardened soils without bending or breaking. Further, there is a need for a high strength shovel blade that can easily penetrate through grassy soil as well as small to moderate sized trees with many small roots.

Still furthermore, an additional problem with most shovels is their lack of an adequate foot placement surface to rest a user's foot on. Most shovels require the user to to press down on an upper often sharp edge of the shovel blade. This thin blade edge does not allow for a stable foot placement for one's foot to rest on. The currently thin upper edge of the shovel can often result in causing the user's foot to slip off the shovel or slide forward into the dug out hole when it is being used. Additionally, the thin upper edge can result in injury to the user when their foot is slipping off while attempting to push the shovel blade downward Furthermore, there is a need for a high strength shovel blade configuration that enables such soil penetrating ability along with providing the user with a stable and secure area on the shovel blade for a stable foot placement allowing for greater forces to be exerted on the shovel blade by a user.

Thus, the need exists for solutions to the above problems with the prior art.

SUMMARY OF THE INVENTION

A primary objective of the present invention is to provide high strength shovels and trowels formed from metal and plastic for enhanced soil and sand penetration and cutting into roots.

A secondary objective of the present invention is to provide high strength shovels and trowels having a strengthened tip edge that does not bend and/or break when used.

A third objective of the present invention is to provide high strength shovels and trowels having a strengthened tip edge that disburses stress when used.

A fourth objective of the present invention is to provide high strength shovels and trowels with a high strength blade that can easily penetrate through grassy soil as well as small to moderate sized trees A fifth objective of the present invention is to provide high strength shovels and trowels that have a stable and secure area on the blade for safe foot placement allowing for greater forces to be exerted on the blade by the user.

A high strength shovel, can include a longitudinal handle portion having an upper end and a lower end, a contiguous blade having an upper concave curved surface, and a lower surface, with a front end, and a rear end attached to the lower end of the handle, foot brakes extending upward from the rear end of the blade, the foot brakes allowing for a stable surface for the user during digging, narrow tip teeth edges extending outward from the front end of the blade, and contiguous embossment portions in the teeth edges for strengthening the blade during digging.

Each of the foot brakes can include a first bent flange extending substantially upward to the rear end of the blade, and a second bent flange extending rearward from the first bent flange.

The narrow tip teeth edges can include 8 narrow tip teeth edges. The narrow tip teeth edges can include 4 narrow tip teeth edges. The narrow tip teeth edges can include 3 narrow tip teeth edges. The narrow tip teeth edges can include 2 teeth edges, or one teeth edge. The narrow teeth edge can be generally triangular shaped or wedge shaped.

The embossment can have a tear drop shaped indented surface portion. The embossment can have a generally triangular shaped indented surface portion.

The generally triangular shaped indented portion of each narrow tip teeth edge can include a rounded tip and a rounded base.

Each of the narrow tip teeth edges can include a base on the front end of the blade, and each generally triangular shaped indented surface portion have bases extending rearwardly behind the base of the narrow tip teeth edges.

Each generally triangular shaped indented surface portion can include an enlarged width of approximately 0.63 inches, and a length between a base and a tip being approximately 1.25 inches, wherein the tip of the generally triangular shaped indented surface portion is spaced approximately 0.36 inches from an exterior tip of the narrow tip teeth edges. The blade can include a thickness of approximately 0.06 inches, and the indented surface portion has a depth of approximately 0.12 inches.

Each generally triangular shaped indented surface portion can include an enlarged width of approximately 0.71 inches, and a length between a base and a tip being approximately 1.31 inches, wherein the tip of the generally triangular shaped indented surface portion is spaced approximately 0.41 inches from an exterior tip of the narrow tip teeth edges. The blade can include a thickness of approximately 0.12 inches and the indented surface portion has a depth of approximately 0.22 inches.

Each generally triangular shaped indented surface portion can include an enlarged width of approximately 0.74 inches, and a length between a base and a tip being approximately 1.34 inches, wherein the tip of the generally triangular shaped indented surface portion is spaced approximately 0.35 inches from an exterior tip of the narrow tip teeth edges. The blade can include a thickness of approximately 0.13 inches and the indented surface portion has a depth of approximately 0.23 inches.

The first bent flange of the foot brakes can extend upward approximately 0.79 inches from the rear end of the blade, the second bent flange extends rearwardly approximately 0.49 inches from the blade, and the second bent flange is angled approximately 135 degrees to the first bent flange.

The foot brakes can include raised ribs for attaching the first bent flange to the rear end of the blade for reinforcing and strengthening the foot brakes.

A version of the high strength digging tool, can include a handle having an upper end and a lower end, a blade having an upper generally concave curved surface, and a lower surface, with a front end, and a rear end attached to the lower end of the handle, at least two narrow tip teeth edges extending outward from the front end of the blade, and an embossed portion in each of the teeth edges for strengthening the blade and disbursing stress during digging.

The embossed portion can include indented portion that runs from behind the front end of the blade to outside the front end of the blade into the narrow tip teeth edges. The embossed portion can also be a raised portion for strengthening the blade, and disbursing stress along the blade when the tool is used for digging.

The invention can be used for different sized shovels and trowels.

Further objects and advantages of this invention will be apparent from the following detailed description of the presently preferred embodiments which are illustrated schematically in the accompanying drawings.

BRIEF DESCRIPTION OF THE FIGURES

FIG. 2 is a lower perspective view of the 8 point full size steel shovel of FIG. 1.

FIG. 3 is an upper face view of the 8 point steel shovel of FIG. 1.

FIG. 3A is a side cross-sectional view of the embossment detail of the shovel of FIG. 1 along arrow 3A.

FIG. 3B is an enlarged view of a single embossment of FIG. 3.

FIG. 4 is a side view of the 8 point steel shovel of FIG. 1.

FIG. 5 is a back view of the 8 point steel shovel of FIG. 4 along arrow 5X.

FIG. 6 is a front view of the 8 point steel shovel of FIG. 4 along arrow 6X.

FIG. 7 is a side tilted view of the 8 point steel shovel of FIG. 1.

FIG. 7A is an enlarged view of a foot brake on the 8 point steel shovel of FIG. 7.

FIG. 9 is a lower perspective view of the 4 point full size steel shovel of FIG. 8.

FIG. 10 is an upper face view of the 4 point steel shovel of FIG. 8.

FIG. 11 is a side view of the 4 point steel shovel of FIG. 8.

FIG. 12 is a back view of the 4 point steel shovel of FIG. 11 along arrow 12X.

FIG. 13 is a front view of the 4 point steel shovel of FIG. 11 along arrow 13X.

FIG. 14 is an upper perspective view of a novel 3 point plastic shovel.

FIG. 16A is a side cross-sectional view of the embossment of FIG. 16 along arrow 16A.

FIG. 16B is an enlarged view of a single embossment of FIG. 16.

FIG. 20 is a side tilted view of the 3 point plastic shovel of FIG. 14.

FIG. 20A is an enlarged view of a brake of the 3 point plastic shovel of FIG. 20.

FIG. 21 is an upper perspective view of a novel 3 point plastic trowel.

FIG. 22 is a rear perspective view of the 3 point plastic trowel of FIG. 21.

FIG. 23 is a face view of the 3 point plastic trowel of FIG. 21.

FIG. 23A is a side cross-sectional view of the embossment of FIG. 23 along arrow 23A.

FIG. 23B is an enlarged view of an embossment of FIG. 23.

FIG. 24 is a side view of the 3 point plastic trowel of FIG. 21.

FIG. 24A is a front end view of the 3 point plastic trowel of FIG. 24 along arrow 24A.

FIG. 25 is an upper perspective view of a novel 2 point plastic trowel.

FIG. 32 is a side view of the 2 point plastic trowel with extended side walls of FIG. 29.

FIG. 32A is a front end view of the 2 point plastic trowel of FIG. 32 along arrow 32A.

DESCRIPTION OF THE PREFERRED EMBODIMENTS

Figure 1:
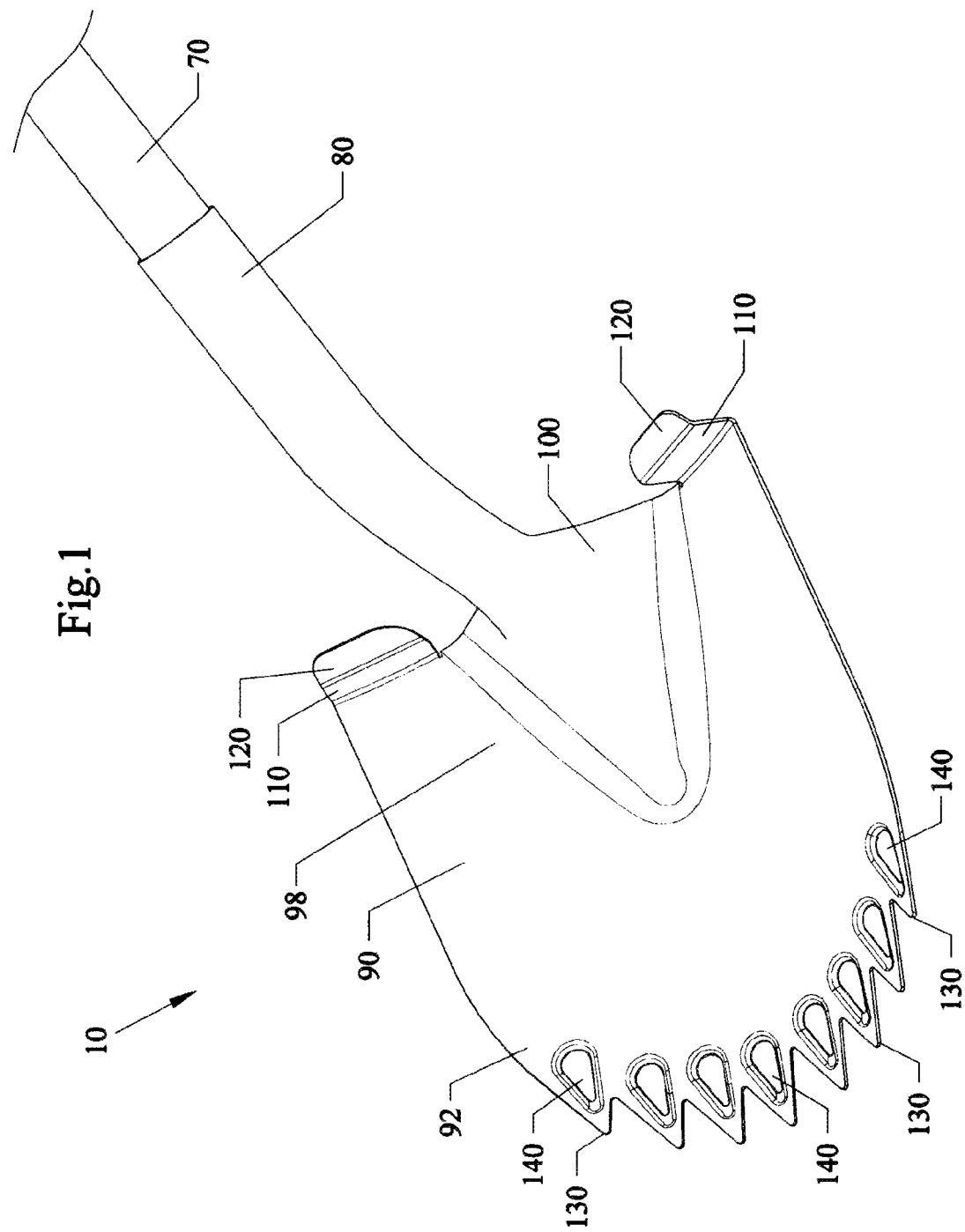
FIG. 1 is an upper perspective view of a novel 8 point full size steel shovel.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A list of the components will now be described.

10. 8 point full size steel shovel.
20. 4 point full size steel shovel.
30. 3 point small plastic shovel.
40. 3 point trowel.
50. 2 point trowel.
60. 2 point trowel with extended sides.
70. Shovel handle.
80. Socket for shovel handle.
90. Shovel blade.
92. front end of blade
98. rear end of blade
100. Shovel hosel (formed sheet metal transition between socket and blade).
110. Foot brake.
120. Foot brake extension.
130. Biting shovel point/tooth.
132. tip of point/tooth.
138. base of point/tooth.
140. Strengthening embossment in shovel points.
141. rounded rear end of embossment
142. rear slope of embossment
145. base of embossment
148. front slope of embossment
149. rounded front end of embossment
150. Trowel blade.
152. front end of blade
158. rear end of blade
159. rear wall of blade
160. Trowel handle.
170. Extended trowel sides.
180. Biting trowel point.
182. tip of point/tooth
188. base of point/tooth
190. Strengthening embossment in trowel points.
191. rear end
192. bottom of embossment
199. front end
200. Reinforcement ribs for trowel blade.
210. Hole in trowel handle for tether or hanging on a wall.
220. Reinforcement ribs for foot brake.

8 Point Full Size Steel Shovel

FIG. 1 is an upper perspective view of a novel 8 point full size steel shovel 10 that can include a blade 90 and hosel 100 and shovel handle 70 machined from metal. FIG. 2 is a lower perspective view of the 8 point full size steel shovel 10 of FIG. 1. The novel shovel 10 can include a generally concave shaped metal blade 90 having a front end 92 with a plurality of teeth/points 130, each with embossments 140 that are indented in each tooth/point 130. In this embodiment, there can be 8 points/teeth along the front end 92 of the blade 90. The rear end 98 of the blade 90 can have a shovel hosel 100 that can also be formed from sheet metal as a transition between the blade 90 and socket 80. A shovel handle 70 can be inserted into the outer end of the socket 70.

FIG. 3 is an upper face view of the 8 point steel shovel 10 of FIG. 1. FIG. 3A is a side cross-sectional view of an embossment 140 of the shovel 10 of FIG. 1 along arrow 3A. FIG. 3B is an enlarged view of a single embossment 140 of FIG. 3. The points/teeth 130 can have a generally convex shape. The blade 90 of the shovel 10 can have a width of approximately 8.50 inches wide, and a length between the most outwardly protruding teeth/points and the rear end of the blade having a length of approximately 10.08 inches.

Each of the points/teeth 130 can have a sharp tip end 132 and a base 138 which is also the base for the adjacent point/tooth 130. Within each point/tooth of the points/teeth 130 can be a single embossment 140, which can be an indentation that is used for both strengthening the teeth/points 130 and the blade 90, and disburses stress when the shovel 10 is being used. Through testing, an optimized shape of the embossment 140 can include a generally triangular shape (or tear dropped shaped) having a convex rounded rear end 141 and rounded tip 149, where the rear end 141 is located behind the base 138 of the points/teeth 130, while the rounded tip 149 of the embossment is located within each of the individual teeth/points 130. Each embossment 140 can be an indentation having a rear slope 142, with lower surface 145 and front slope 148.

Each embossment 140 can have an enlarged width portion adjacent to the rounded rear end 141 of approximately 0.63 inches, which narrows down to the rounded tip 149. The length between the rear end 141 and the front end 149 can be approximately 1.25 inches, where the front end of the embossment can be spaced approximately 0.36 inches from an exterior tip 132 of the points/teeth 130. Each of the points/teeth 130 can have a triangular angle from the tip end 132 to the base 138 having an angle of approximately 45 degrees. Each of the embossments 140 can have a triangular angle from the front end 149 to the rear end base 141 having an angle of approximately 30 degrees. In this embodiment, the blade can have a thickness of approximately 0.06 inches, and the indented surface portion (bottom 142 of the embossment) can have a depth of approximately 0.12 inches from the upper surface of the points/teeth 130.

FIG. 4 is a side view of the 8 point steel shovel 10 of FIG. 1. FIG. 5 is a back view of the 8 point steel shovel 10 of FIG. 4 along arrow 5X. FIG. 6 is a front view of the 8 point steel shovel 10 of FIG. 4 along arrow 6X. FIG. 7 is a side tilted view of the 8 point steel shovel 10 of FIG. 1. FIG. 7A is an enlarged view of a foot brake 110 on the 8 point steel shovel 10 of FIG. 7. The foot brake 110 can be located on both sides of the shovel hosel 100 adjacent to the rear end 98 of the blade 90. Each foot brake 110 can have a flange shape formed from the rear end 98 of the blade 90 and extend upward at an approximately 90 degree angle from the surface of the blade 90, and can have a height of approximately 0.79 inches. Extending rearwardly from the top of the foot brake 110 can be foot brake extension 120 also have a flange shape, that can have a length of approximately 0.49 inches, an angle of approximately 135 degrees to the foot brake 110. The foot brake 110 and extension 120 can have a thickness of approximately 0.06 inches.

4 Point Full Size Steel Shovel

Figure 8:
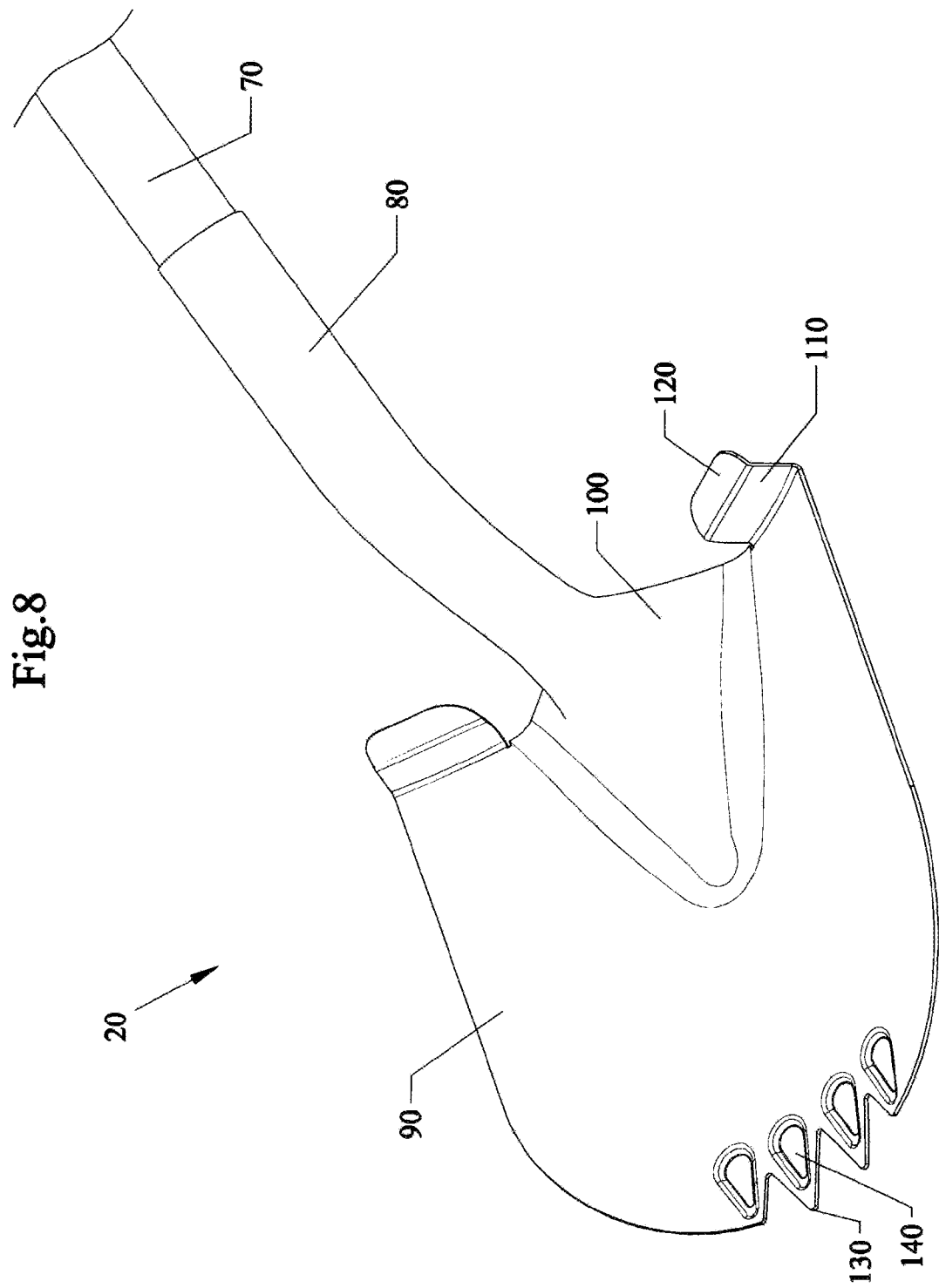
FIG. 8 is an upper perspective view of a novel 4 point full size steel shovel.

FIG. 8 is an upper perspective view of a novel 4 point full size steel shovel 20. FIG. 9 is a lower perspective view of the 4 point full size steel shovel 20 of FIG. 8. FIG. 10 is an upper face view of the 4 point steel shovel 20 of FIG. 8. FIG. 11 is a side view of the 4 point steel shovel 20 of FIG. 8. FIG. 12 is a back view of the 4 point steel shovel 20 of FIG. 11 along arrow 12X. FIG. 13 is a front view of the 4 point steel shovel 20 of FIG. 11 along arrow 13X.

Referring to FIGS. 8-13, the 4 point shovel 20 can be similar to the previously described shovel 10, with the exception that the blade 90 in shovel 20 can have 4 points/teeth 130, with respective embossments 140. The blade 90 here can have a width of approximately 8.50 inches wide, and a length between the most outwardly protruding teeth/points and the rear end of the blade having a length of approximately 10.04 inches. The other features and component numbers are similar to those in the previous version.

3 Point Plastic Shovel

Figure 15:
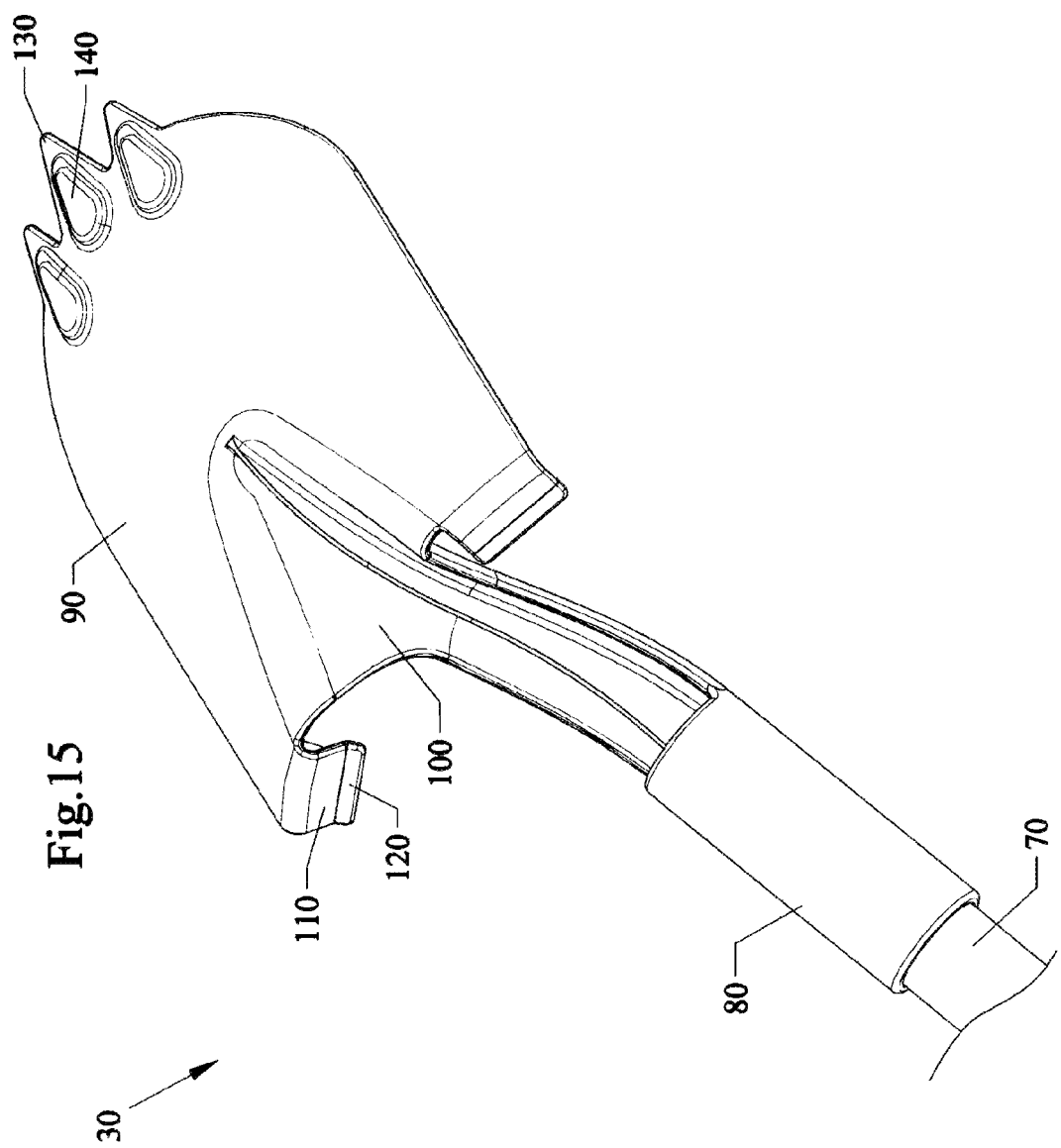
FIG. 15 is a rear perspective view of the 3 point plastic shovel of FIG. 14.
Figure 16:
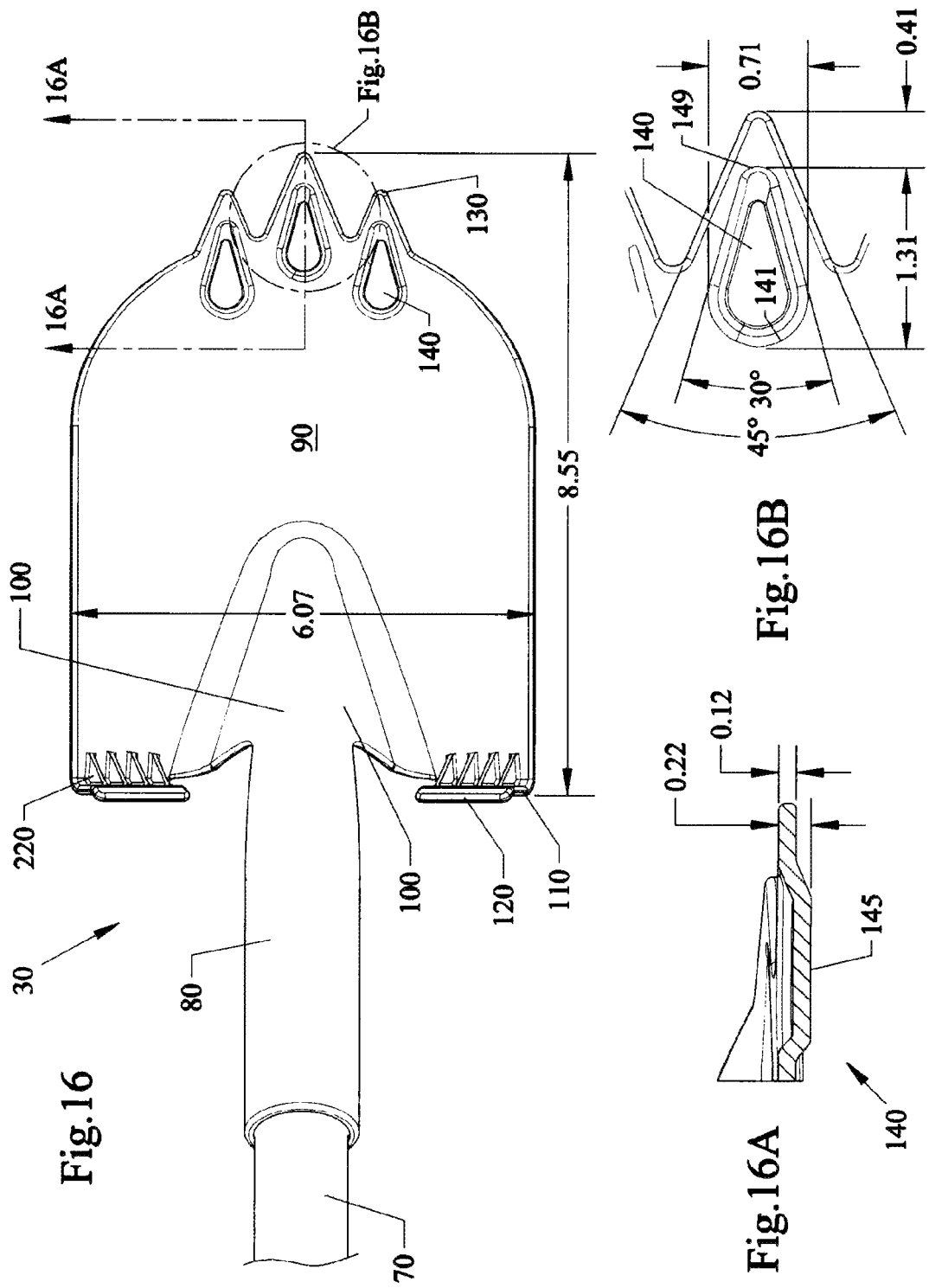
FIG. 16 is a face view of the 3 point plastic shovel of FIG. 14.

FIG. 14 is an upper perspective view of a novel 3 point plastic shovel 30. FIG. 15 is a rear perspective view of the 3 point plastic shovel 30 of FIG. 14. FIG. 16 is a face view of the 3 point plastic shovel 30 of FIG. 14.

Referring to FIGS. 14-16, the 3 point shovel 20 can be similar to the previously described shovels 10, with the exception that the blade 90 in shovel 30 can have 3 points/teeth 130, with respective embossments 140. The blade 90 in this version can have a width of approximately 6.07 inches wide, and a length between the most outwardly protruding teeth/points and the rear end of the blade having a length of approximately 8.55 inches, along with a modified embossment 140 and respective points/teeth 130, as well as having a reinforced foot brake 110.

FIG. 16A is a side cross-sectional view of the embossment 140 of FIG. 16 along arrow 16A, with the embossment having a depth of approximately 0.22 inches, while the thickness of the blade is approximately 0.12 inches.

FIG. 16B is an enlarged view of a single embossment 140 of FIG. 16. Each embossment 140 can have an enlarged width portion adjacent to the rounded rear end 141 of approximately 0.71 inches, which narrows down to the rounded tip 149. The length between the rear end 141 and the front end 149 can be approximately 1.31 inches, where the front end of the embossment 140 can be spaced approximately 0.41 inches from an exterior tip 132 of the points/teeth 130. Each of the points/teeth 130 can have a triangular angle from the tip end 132 to the base 138 having an angle of approximately 45 degrees. Each of the embossments 140 can have a triangular angle from the front end 149 to the rear end 141 having an angle of approximately 30 degrees.

Figure 17:
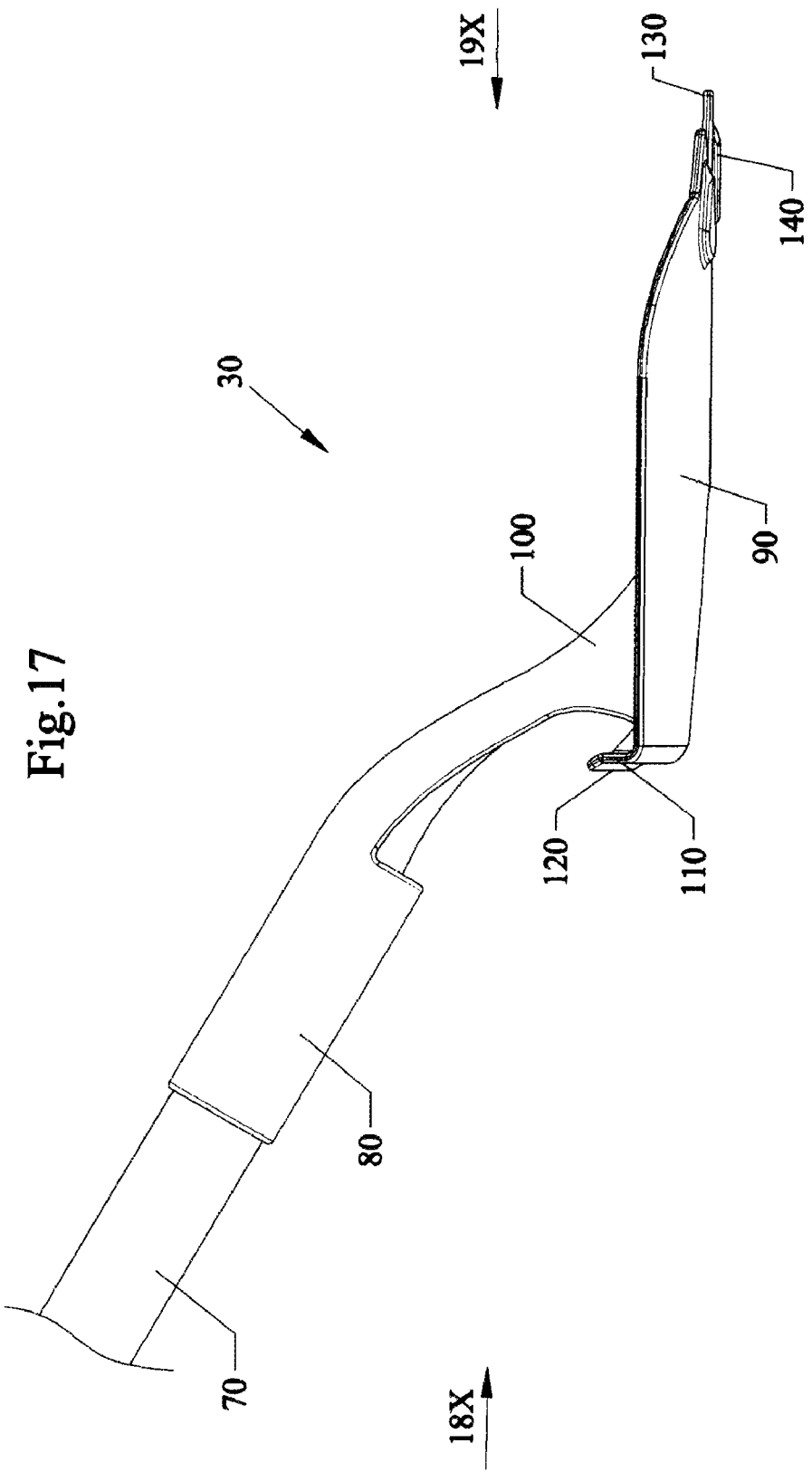
FIG. 17 is a side view of the 3 point plastic shovel of FIG. 14.
Figure 18:
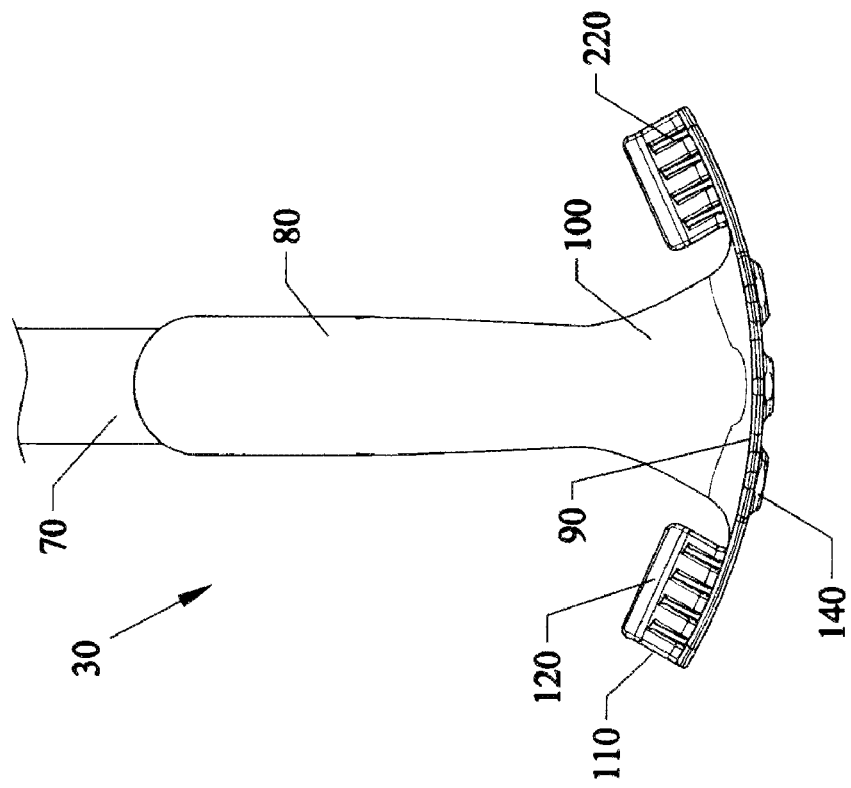
FIG. 18 is a back view of the 3 point plastic shovel of FIG. 17 along arrow 18X.
Figure 19:
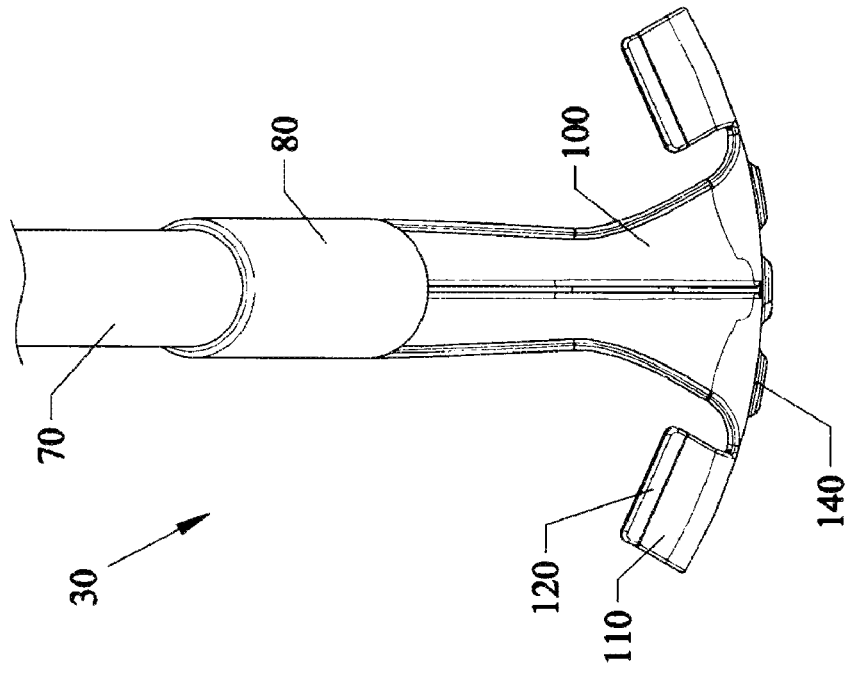
FIG. 19 is a front view of the 3 point plastic shovel of FIG. 17 along arrow 19X.

FIG. 17 is a side view of the 3 point plastic shovel 30 of FIG. 14. FIG. 18 is a back view of the 3 point plastic shovel 30 of FIG. 17 along arrow 18X. FIG. 19 is a front view of the 3 point plastic shovel 30 of FIG. 17 along arrow 19X. FIG. 20 is a side tilted view of the 3 point plastic shovel 30 of FIG. 14. FIG. 20A is an enlarged view of the foot brake 110 and foot brake extension 120 of the 3 point plastic shovel of FIG. 20.

Referring to FIGS. 16, 17-20A, the foot brake 110 can be located on both sides of the shovel hosel 100 adjacent to the rear end 98 of the blade 90. Each foot brake 110 can have a flange shape formed from the rear end 98 of the blade 90 and extend upward at an approximately 90 degree angle from the surface of the blade 90, and can have a height of approximately 1.19 inches. Extending rearwardly from the top of the foot brake 110 can be foot brake extension 120 also have a flange shape, that can have a length of approximately 0.43 inches, at an angle of approximately 30 degrees to the foot brake 110. The foot brake 110 can include a plurality of reinforcement ribs 220 for strengthening the foot brake 110 relative to the blade 90.

3 Point Plastic Trowel

FIG. 21 is an upper perspective view of a novel 3 point plastic trowel 40 that can be formed from injection molded plastic, and the like, that can have a scoop shape. FIG. 22 is a rear perspective view of the 3 point plastic trowel 40 of FIG. 21. FIG. 23 is a face view of the 3 point plastic trowel 40 of FIG. 21.

The trowel 40 can include a concave plastic blade 150 with a front end 152 narrowing to a plurality of biting trowel points/teeth 180 (here 3 points/teeth), and a rear end 158 with generally flat rear wall area 159 that connects to an upwardly and rearwardly projecting trowel handle 160 that can have parallel gripping ribs thereon. A longitudinal reinforcement rib 200 running down the longitudinal axis of the blade 150 adjacent to the rear end 158 can pass on the front surface and lower surface of the rear end 158 of the blade 150 and rear wall 159 of the blade 150. A hole 210 the trowel handle 160 can be used for attaching a tether or to allow the trowel 40 to be hanged from a wall support.

The blade 150 in this version can have a width of approximately 3.74 inches wide, and a length between the most outwardly protruding teeth/points and the rear end of the blade having a length of approximately 6.56 inches, along with a modified embossment 190 and respective points/teeth 180.

FIG. 23A is a side cross-sectional view of the embossment 190 of FIG. 23 along arrow 23A. FIG. 23B is an enlarged view of an embossment 190 of FIG. 23.

Each embossment 190 can have an enlarged width portion adjacent to the rounded rear end 191 of approximately 0.74 inches, which narrows down to the rounded tip 199. The length between the rear end 191 and the front end 199 can be approximately 1.34 inches, where the front end of the embossment 190 can be spaced approximately 0.35 inches from an exterior tip 182 of the points/teeth 180. Each of the points/teeth 180 can have a triangular angle from the tip end 182 to the base 188 having an angle of approximately 47 degrees. Each of the embossments 190 can have a triangular angle from the front end 199 to the base 191 having an angle of approximately 32 degrees. In this embodiment, the blade 150 can have a thickness of approximately 0.13 inches, and the indented surface portion (bottom 192 of the embossment 190) can have a depth of approximately 0.23 inches from the upper surface of the points/teeth 180.

FIG. 24 is a side view of the 3 point plastic trowel 40 of FIG. 21. FIG. 24A is a front end view of the 3 point plastic trowel 40 of FIG. 24 along arrow 24A. The sides of trowel 40 can have a height of approximately 1.49 inches.

2 Point Plastic Trowel

Figure 26:
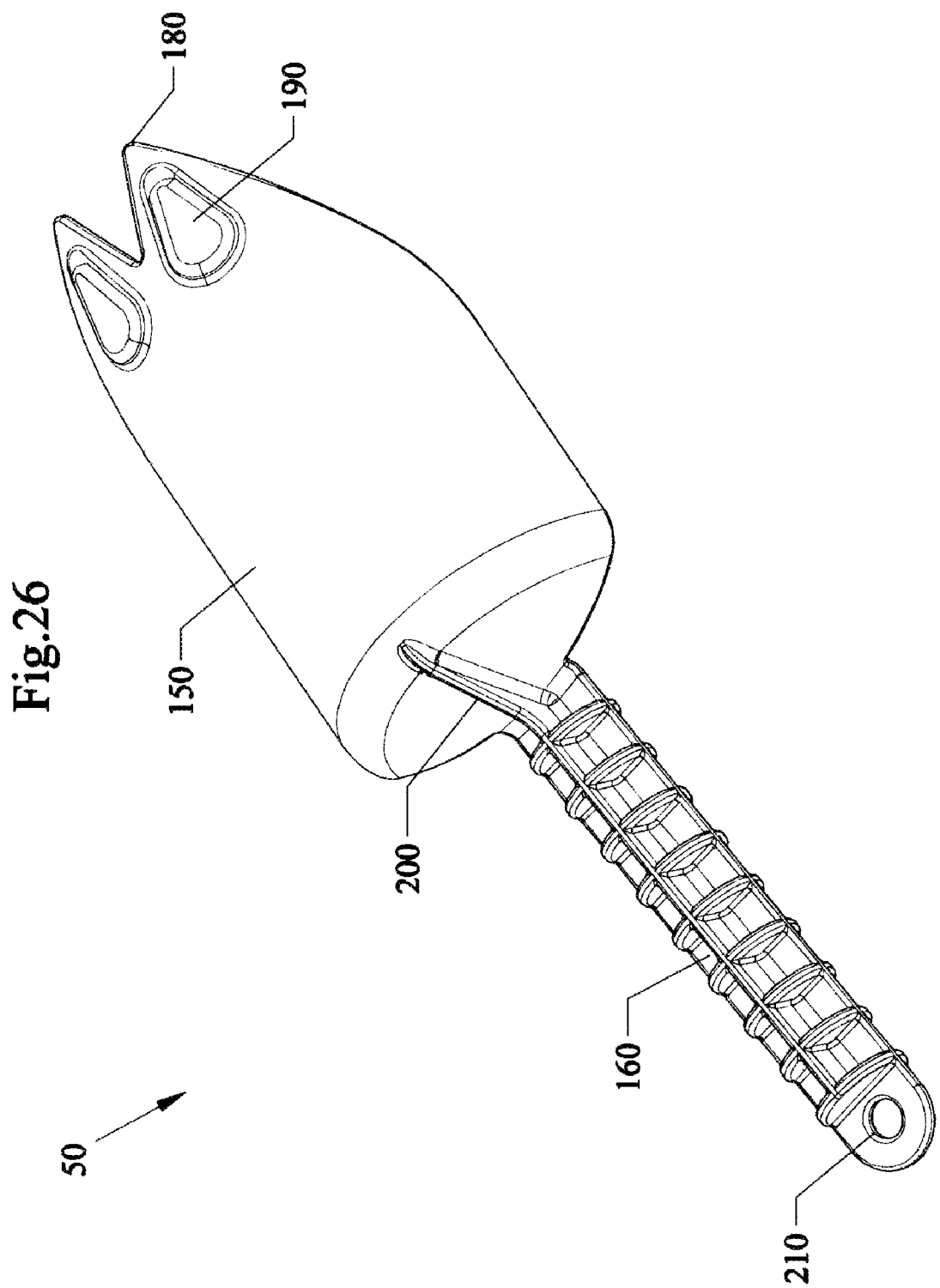
FIG. 26 is a rear perspective view of the 2 point plastic trowel of FIG. 25.
Figure 27:
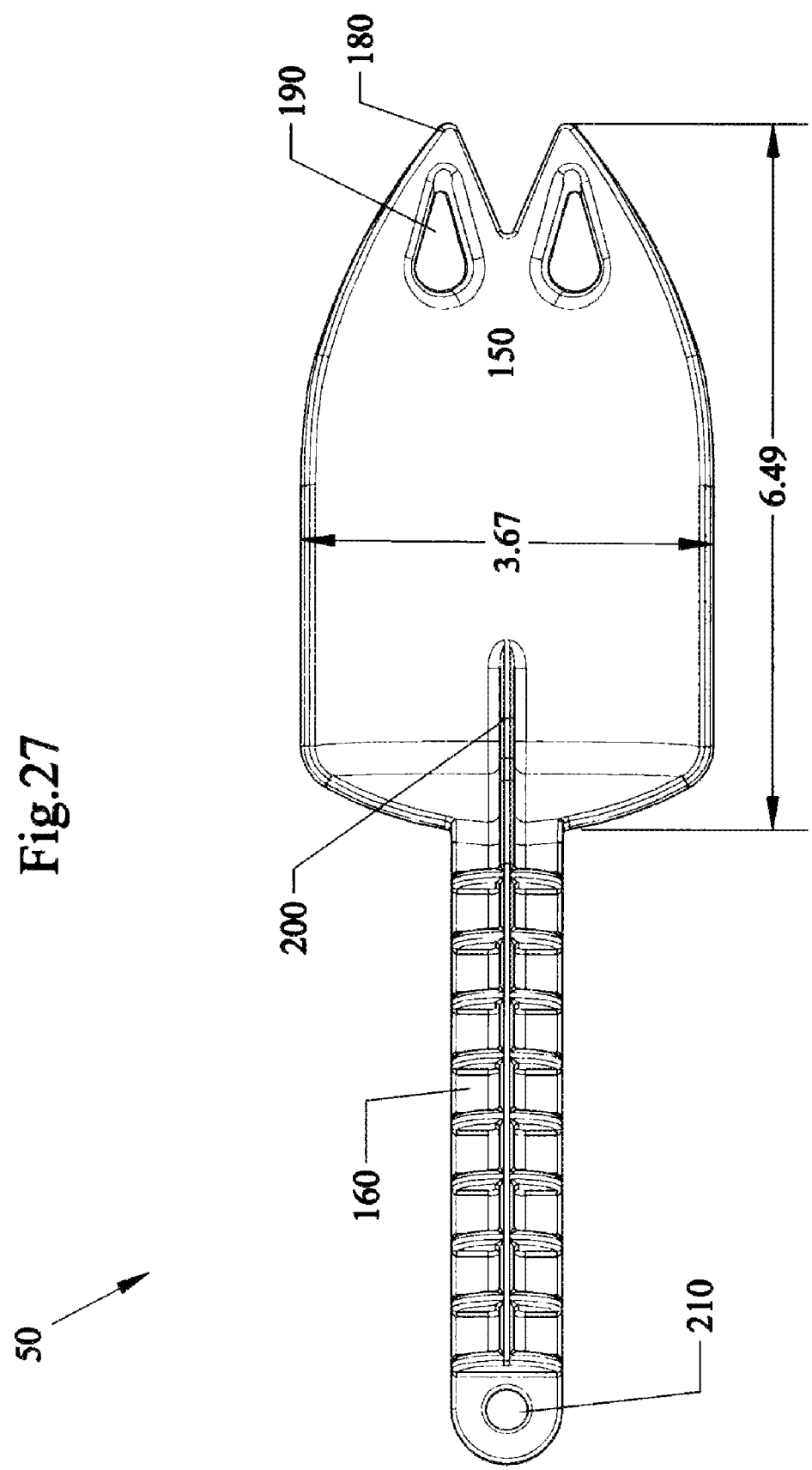
FIG. 27 is a face view of the 2 point plastic trowel of FIG. 25.
Figures 28, 28A:
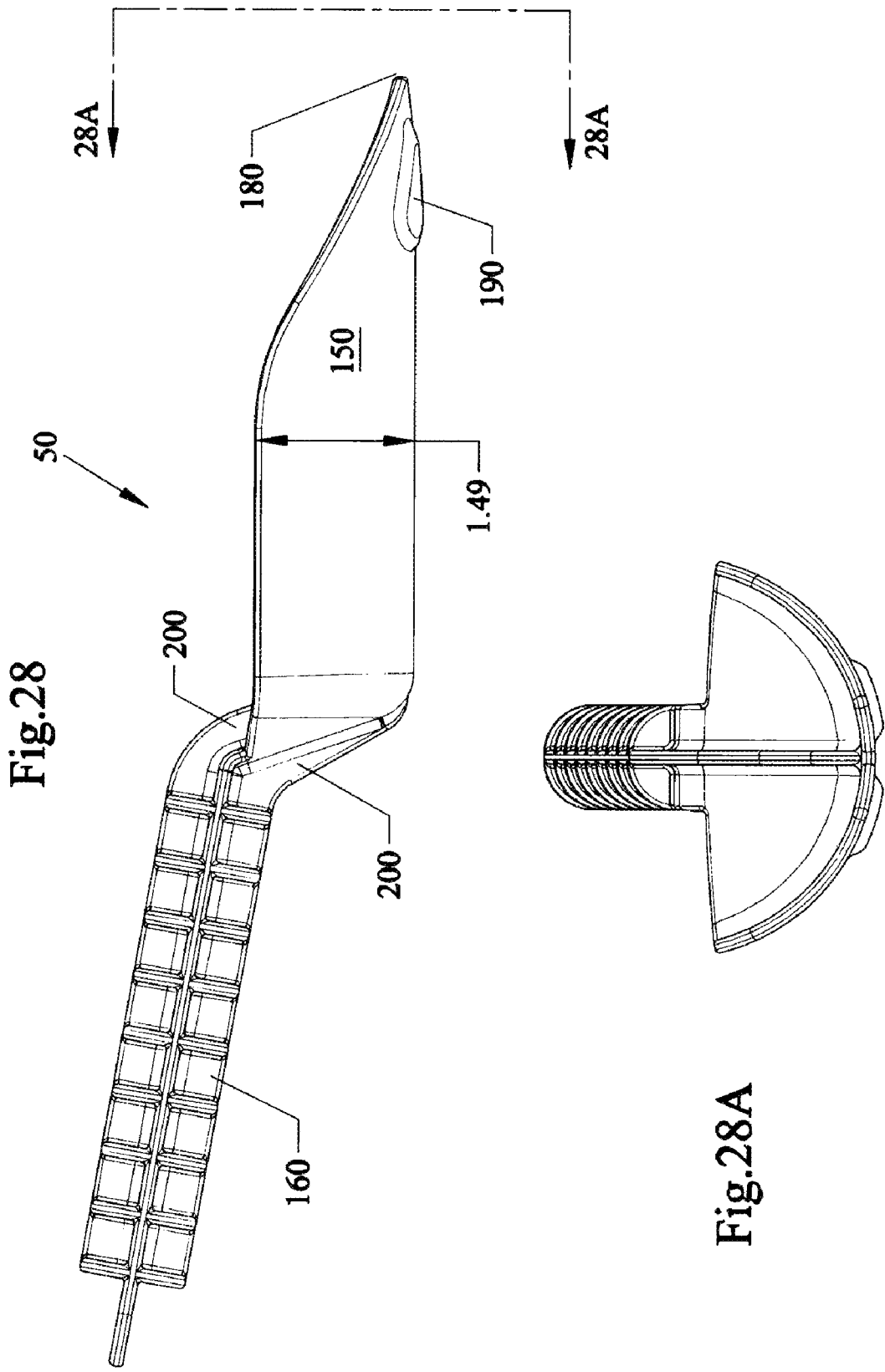
FIG. 28 is a side view of the 2 point plastic trowel of FIG. 25.
FIG. 28A is a front end view of the 2 point plastic trowel of FIG. 28 along arrow 28A.

FIG. 25 is an upper perspective view of a novel 2 point plastic trowel 50. FIG. 26 is a rear perspective view of the 2 point plastic trowel 50 of FIG. 25. FIG. 27 is a face view of the 2 point plastic trowel 50 of FIG. 25. FIG. 28 is a side view of the 2 point plastic trowel of FIG. 25. FIG. 28A is a front end view of the 2 point plastic trowel of FIG. 28 along arrow 28A. This version can be similar to the previous trowel 40 described above, with the exception of having 2 points/teeth 180 with respective embossments 190, and modified dimensions.

The blade 150 in this trowel 50 can have a width of approximately 3.67 inches wide, and a length between the most outwardly protruding teeth/points and the rear end of the blade having a length of approximately 6.49 inches, along with a embossments 190 and respective points/teeth 180, as previously described. The sides of trowel 50 can have a height of approximately 1.49 inches.

2 Point Plastic Trowel with Extended Side Walls

Figure 29:
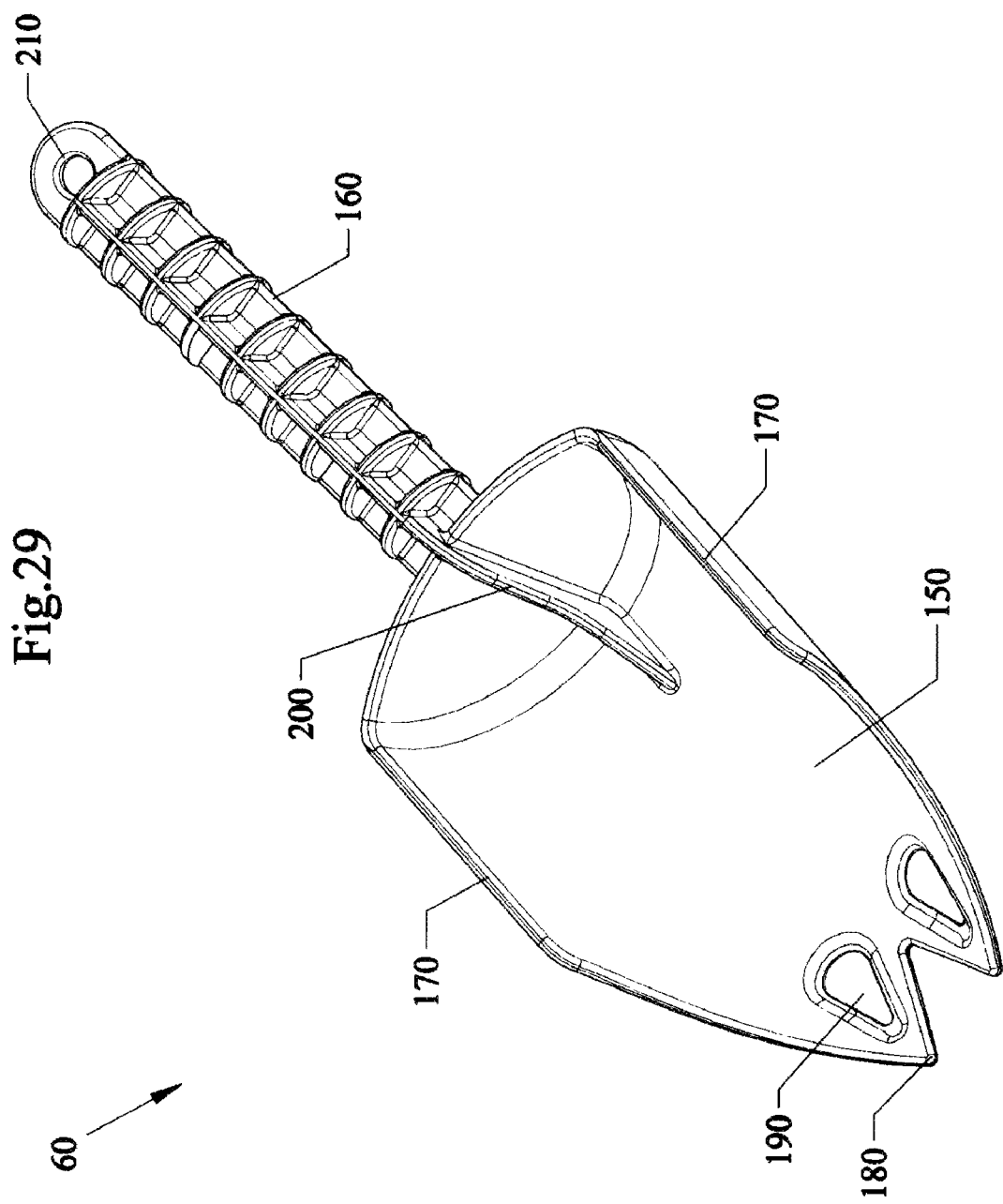
FIG. 29 is a front perspective view of a novel 2 point plastic trowel with extended side walls.
Figure 30:
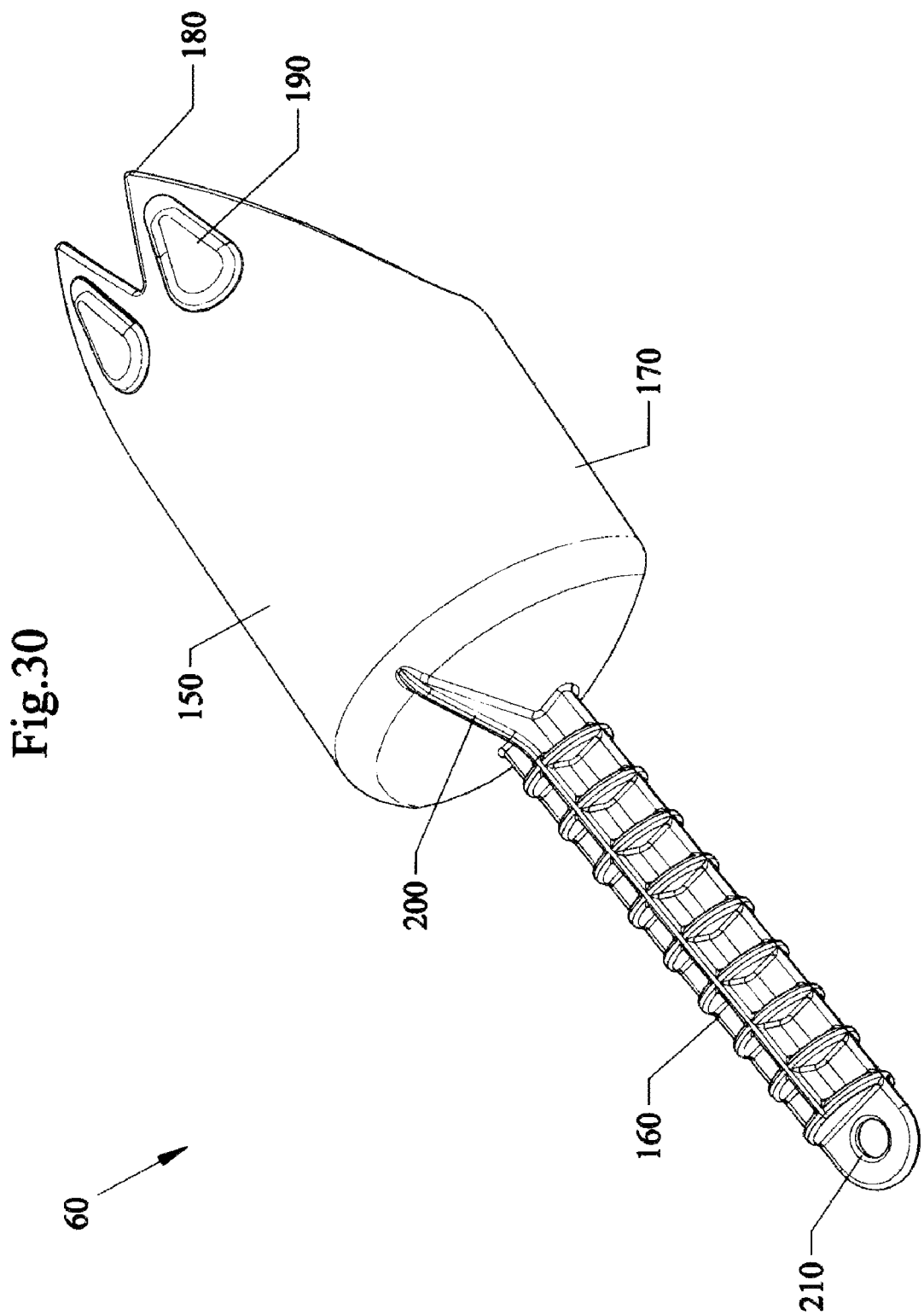
FIG. 30 is a rear perspective view of the 2 point plastic trowel with extended side walls of FIG. 29.
Figure 31:
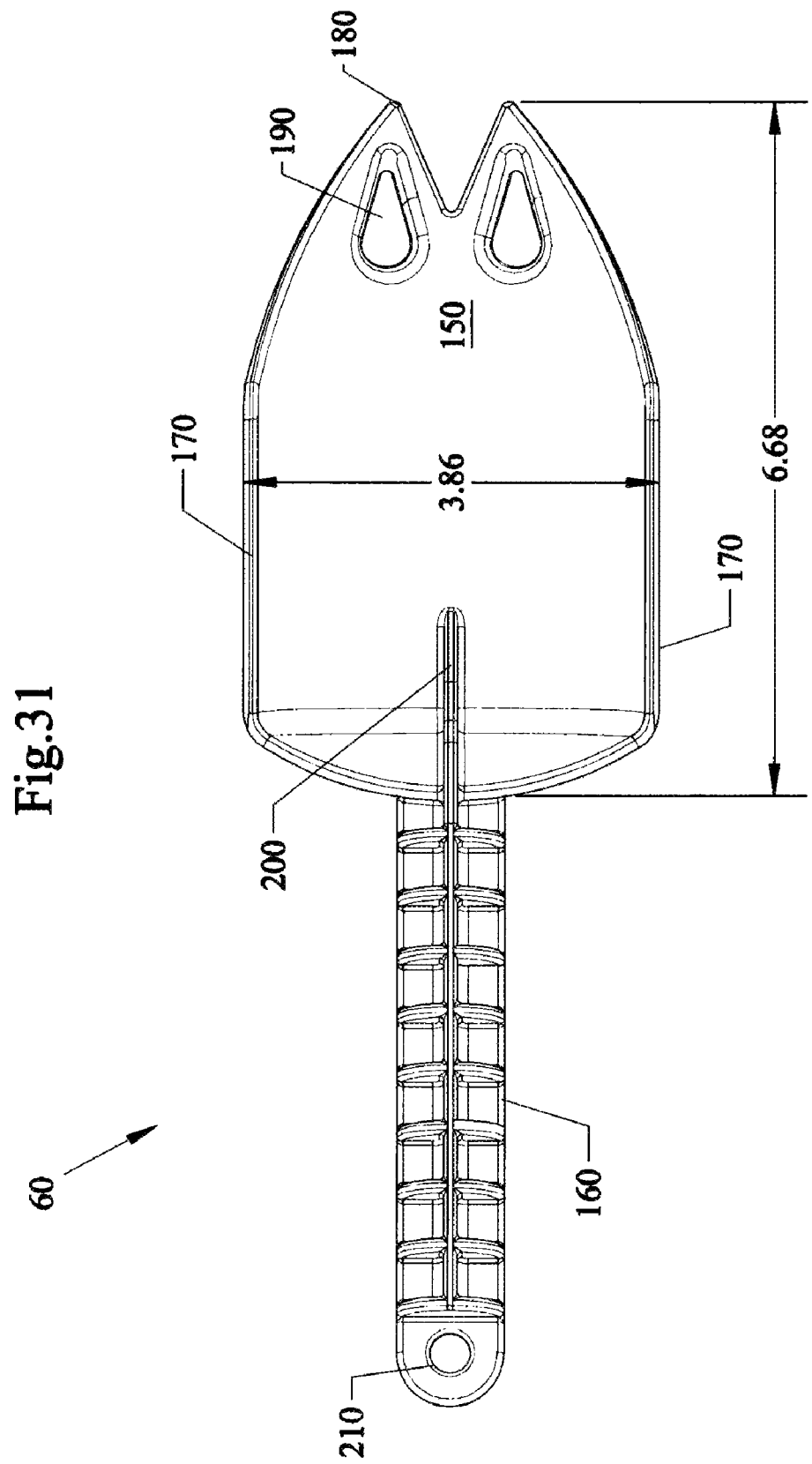
FIG. 31 is a face view of the 2 point plastic trowel with extended side walls of FIG. 29.

FIG. 29 is a front perspective view of a novel 2 point plastic trowel 60 with extended side walls. FIG. 30 is a rear perspective view of the 2 point plastic trowel 60 with extended side walls 170 of FIG. 29. FIG. 31 is a face view of the 2 point plastic trowel 60 with extended higher side walls of FIG. 29. FIG. 32 is a side view of the 2 point plastic trowel 60 with extended side walls 170 of FIG. 29. FIG. 32A is a front end view of the 2 point plastic trowel 60 of FIG. 32 along arrow 32A. The blade 150 in this trowel 50 can have a width of approximately 3.86 inches wide, and a length between the most outwardly protruding teeth/points and the rear end of the blade having a length of approximately 6.68 inches, along with a embossments 190 and respective points/teeth 180, as previously described.

While the invention has been described as being used for shovels having convex curved blade ends, the invention can be used for other types of shovels, such as but not limited to side cutter shovels, snow shovels, coal shovels, ice shovels. The invention can be used with shovels having flat blade edges, as well as rounded edges, concave edges, and the like.

Although the invention has been described, as being used with shovels and trowels, the invention can be used with other tools, such as but not limited to the blades on post hole diggers, hoes, and pitch axes, and the like.

While the invention describes embodiments with at least two embossments in a blade edge, the invention can be used with a single embossment in a single blade edge.

Although the invention describes shovels and trowels, the invention can be used for different sized tools, as well as downsized tools, and tools used as toys.

Although the teeth/points shown in the drawings are generally triangular or V shaped, other shapes of teeth/points can be used. For example, it would be possible to have other shapes such as rectangular shapes with wedge shaped side edges, and embossments that match, such as rectangular embossments. Other shapes and embossments details can also be covered by this invention.

Although, the embossed portions in the points/teeth are shown as indented, the embossments can be raised portions, and the like, also for increasing strength and disbursing stress. Alternatively, the embossed portions can include a combination or raised and/or indented portion(s).

While some embodiments have been described as being formed from steel, other types of metal, such as but not limited to galvanized metal, alloys, aluminum, composites, and the like, can be used.

While some embodiments have been described, as being formed from steel, these embodiments can be formed form other nonsteel materials such as molded plastic, fiberglass, and the like, can be used.

While some embodiments have been described as being formed from plastic, other materials, such as but not limited to fiberglass, composites, metal, alloys, and the like, can be used.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A shovel, comprising:
   a handle portion having an upper end and a lower end, and a longitudinal axis therebetween;
   a blade having an upper surface, and a lower surface, with a front end, and a rear end attached to the lower end of the handle portion;
   foot brakes extending upward from the rear end of the blade, the foot brakes having a flat horizontal surface edge allowing for a stable surface form foot of the user to contact during digging, wherein each of the foot brakes has a first bent flange extending substantially upward at an angle from the rear end of the blade, and a second bent flange extending rearward from a top of the first bent flange at an angle of approximately 135 degrees, the second bent flange having a flat horizontal top edge when the shovel is in a raised vertical orientation to allow for the stable surface for the user to push on during digging;
   one or more narrow tip teeth edges extending outward from the front end of the blade, each of the narrow tip teeth edges having a triangular shape with flat inwardly angled sides; and
   embossed surface portions formed in the one or more narrow teeth edges for strengthening the blade and disbursing stress when the shovel is used for digging applications, each of the embossed surface portions having a rounded rear end that runs from behind the front end of the blade to a narrow tip end located in each of the narrow tip teeth edges.

2. The shovel of claim 1, wherein the narrow tip teeth edges include 8 narrow tip teeth edges.

3. The shovel of claim 1, wherein the narrow tip teeth edges include 4 narrow tip teeth edges.

4. The shovel of claim 1, wherein the narrow tip teeth edges include 3 narrow tip teeth edges.

5. The shovel of claim 1, wherein the narrow tip teeth edges include 2 narrow tip teeth edges.

6. The shovel of claim 1, wherein each generally triangular shaped indented surface portion has an enlarged width of approximately 0.63 inches, and a length between a base and a tip being approximately 1.25 inches, wherein the tip of the generally triangular shaped indented surface portion is spaced approximately 0.36 inches from an exterior tip of the narrow tip teeth edges.

7. The shovel of claim 6, wherein the blade has a thickness of approximately 0.06 inches, and the indented surface portion has a depth of approximately 0.12 inches.

8. The shovel of claim 1, wherein each generally triangular shaped indented surface portion has an enlarged width of approximately 0.71 inches, and a length between a base and a tip being approximately 1.31 inches, wherein the tip of the generally triangular shaped indented surface portion is spaced approximately 0.41 inches from an exterior tip of the narrow tip teeth edges.

9. The shovel of claim 8, wherein the blade includes a thickness of approximately 0.12 inches and the indented surface portion has a depth of approximately 0.22 inches.

10. The shovel of claim 1, wherein each generally triangular shaped indented surface portion has an enlarged width of approximately 0.74 inches, and a length between a base and a tip being approximately 1.34 inches, wherein the tip of the generally triangular shaped indented surface portion is spaced approximately 0.35 inches from an exterior tip of the narrow tip teeth edges.

11. The shovel of claim 10, wherein the blade includes a thickness of approximately 0.13 inches and the indented surface portion has a depth of approximately 0.23 inches.

12. The shovel of claim 1, wherein the first bent flange of the foot brakes extends upward approximately 0.79 inches from the rear end of the blade, the second bent flange extends rearwardly approximately 0.49 inches from the blade.

13. The shovel of claim 1, further comprising:
   raised ribs attaching the first bent flange to the rear end of the blade for reinforcing the foot brakes.

14. The shovel of claim 1, wherein each of the narrow tip teeth edges has an angle from a tip end to a rear end of approximately 45 degrees, and
   each of the embossed surface portions has an angle from the narrow tip end to the rounded rear end of approximately 30 degrees.

15. The shovel of claim 1, wherein each of the embossed surface portions includes a front slope and a rear slope and a flat base surface therebetween.

16. A digging tool, comprising:
   a handle portion having an upper end and a lower end;

a blade having an upper surface, and a lower surface, with a front end, and a rear end attached to the lower end of the handle portion;

foot brakes extending upward from the rear end of the blade, the foot brakes having a flat horizontal surface edge allowing for a stable surface for a foot of the user to contact during digging, wherein each of the foot brakes has a first bent flange extending substantially upward at an angle from the rear end of the blade, and a second bent flange extending rearward from a top of the first bent flange at an angle of approximately 135 degrees, the second bent flange having a flat horizontal top edge when the shovel is in a raised vertical orientation to allow for the stable surface for the user to push on during digging;

at least two narrow tip teeth edges extending outward from the front end of the blade, each of the narrow tip teeth edges having a triangular shape with flat inwardly angled sides; and an embossed portion in each of the narrow teeth edges for strengthening the blade and disbursing stress during digging, each embossed portion having rounded rear end that runs from behind the front end of the blade to a narrow tip end located in each of the narrow tip teeth edges.

17. The digging tool of claim 16, wherein each of the narrow tip teeth edges has an angle from a tip end to a rear end of approximately 45 degrees, and each embossed portion has an angle from the narrow tip end to the rounded rear end of approximately 30 degrees.

18. The digging tool of claim 16, wherein each embossed portion includes a front slope and a rear slope and a flat base surface therebetween.

* * * * *

UNITED STATES PATENT AND TRADEMARK OFFICE
CERTIFICATE OF CORRECTION

PATENT NO. : 8,388,031 B1
APPLICATION NO. : 13/111519
DATED : March 5, 2013
INVENTOR(S) : Richard Zang Page 1 of 1

It is certified that error appears in the above-identified patent and that said Letters Patent is hereby corrected as shown below:

Title Page, item (74),

The name of the firm on the first page of the patent should read:

Law Offices of Brian S. Steinberger, P.A.

Signed and Sealed this
Thirtieth Day of July, 2013

Teresa Stanek Rea
*Acting Director of the United States Patent and Trademark Office*